United States Patent
Fujimoto et al.

(10) Patent No.: US 11,019,152 B2
(45) Date of Patent: May 25, 2021

(54) EQUIPMENT INSTALLATION SUPPORT SYSTEM

(71) Applicant: DAIKIN INDUSTRIES, LTD., Osaka (JP)

(72) Inventors: Shinichirou Fujimoto, Osaka (JP); Hiroshi Doumae, Osaka (JP); Daisuke Satou, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/562,255

(22) Filed: Sep. 5, 2019

(65) Prior Publication Data

US 2019/0394278 A1    Dec. 26, 2019

Related U.S. Application Data

(63) Continuation of application No. PCT/JP2018/013374, filed on Mar. 29, 2018.

(30) Foreign Application Priority Data

Mar. 31, 2017    (JP) .............................. JP2017-069904

(51) Int. Cl.
  *H04L 29/08* (2006.01)
  *G06F 16/18* (2019.01)
  (Continued)

(52) U.S. Cl.
  CPC ............ H04L 67/125 (2013.01); G06F 16/18 (2019.01); G06K 19/06037 (2013.01);
  (Continued)

(58) Field of Classification Search
  CPC ............... H04L 67/125; H04L 12/2827; H04L 12/2825; H04L 2012/285;
  (Continued)

(56) References Cited

U.S. PATENT DOCUMENTS

| 7,092,794 B1 * | 8/2006 | Hill | G08C 17/02 700/108 |
| 2008/0140487 A1 * | 6/2008 | Fendelman | G06Q 10/04 705/7.19 |

(Continued)

FOREIGN PATENT DOCUMENTS

| JP | 2007-6320 A | 1/2007 |
| JP | 2007-132620 A | 5/2007 |

(Continued)

OTHER PUBLICATIONS

International Preliminary Report of corresponding PCT Application No. PCT/JP2018/013374 dated Oct. 10, 2019.

(Continued)

*Primary Examiner* — Michael A Keller
(74) *Attorney, Agent, or Firm* — Global IP Counselors, LLP

(57) ABSTRACT

An equipment installation support system is usable to support setting of a plurality of pieces of equipment intended to be installed in a plurality of buildings. The support system includes a plurality of recording tools, and a server. Each recording tool is assigned to one of the plurality of pieces of equipment and includes a medium having recorded information concerning the assigned one of the plurality of pieces of equipment. The server manages the plurality of pieces of equipment. A specific piece of equipment is intended to be installed in a specific building among the plurality of buildings and has a configuration to adjust a room environment of the specific building. A specific recording tool is assigned second identification information that is assigned to the specific piece of equipment and identifies the specific piece of equipment from pieces of equipment other than the specific piece of equipment.

14 Claims, 21 Drawing Sheets

(51) Int. Cl.
*G06K 19/06* (2006.01)
*G06Q 10/06* (2012.01)
*H04L 12/28* (2006.01)
*H04W 12/06* (2021.01)
*H04W 24/02* (2009.01)

(52) U.S. Cl.
CPC ..... *G06Q 10/0631* (2013.01); *H04L 12/2825* (2013.01); *H04L 12/2827* (2013.01); *H04W 12/06* (2013.01); *H04W 24/02* (2013.01); *H04L 2012/285* (2013.01); *H04L 2012/2841* (2013.01)

(58) Field of Classification Search
CPC ....... H04L 2012/2841; H04L 12/2803; H04W 24/02; H04W 12/06; G06Q 10/0631; G06Q 50/16; G06K 19/06037; G06F 16/18; G06F 21/604; G06F 16/909; F24F 13/32; F24F 1/60
See application file for complete search history.

(56) References Cited

U.S. PATENT DOCUMENTS

| | | | | |
|---|---|---|---|---|
| 2014/0095164 A1* | 4/2014 | Sone | .................. | H04L 51/16 704/260 |
| 2014/0180581 A1* | 6/2014 | Berlin | .................. | G06F 17/40 701/491 |
| 2015/0075765 A1* | 3/2015 | Bakewell | .............. | F24D 11/004 165/287 |
| 2015/0293540 A1* | 10/2015 | Izumihara | ............ | G05B 19/042 700/276 |
| 2015/0369612 A1* | 12/2015 | Nishimura | ......... | G01C 21/3484 701/537 |
| 2016/0061470 A1 | 3/2016 | Nagamine et al. | | |
| 2016/0087811 A1 | 3/2016 | Yin et al. | | |
| 2017/0070379 A1* | 3/2017 | Kim | ..................... | H04L 41/24 |
| 2018/0020395 A1 | 1/2018 | Suyama et al. | | |

FOREIGN PATENT DOCUMENTS

| | | |
|---|---|---|
| JP | 2008-215760 A | 9/2008 |
| JP | 2010-38430 A | 2/2010 |
| JP | 2013-534653 A | 9/2013 |
| JP | 2016-537933 A | 12/2016 |
| JP | 2017-40779 A | 2/2017 |
| WO | 2011/147913 A1 | 12/2011 |
| WO | WO-2012023297 A1 * | 2/2012 ................ F24F 5/00 |

OTHER PUBLICATIONS

International Search Report of corresponding PCT Application No. PCT/JP2018/013374 dated Jun. 26, 2018.
European Search Report of corresponding EP Application No. 18 775 118.5 dated Feb. 5, 2020.

* cited by examiner

| No. | BUILDING ID (CL1) | DEVICE ID (CL2) | INSTALLATION INFORMATION (CL3) | |
|---|---|---|---|---|
| | | | SSID (CL31) | INSTALLATION LOCATION (CL32) |
| 1001 | α1 | β1 | γ1 | δ1 |
| 1002 | α1 | β2 | γ1 | δ2 |
| ... | ... | ... | ... | ... |
| 1101 | α11 | β101 | γ51 | δ101 |
| 1102 | α11 | β102 | γ52 | δ102 |
| ... | ... | ... | ... | ... |

| No. | BUILDING ID (CL1) | DEVICE ID (CL2) | INSTALLATION INFORMATION (CL3) | | DATA (CL4) | |
|---|---|---|---|---|---|---|
| | | | SSID (CL31) | INSTALLATION LOCATION (CL32) | ACCUMULATED OPERATION TIME (CL41) | REPAIR (CL42) |
| 1021 | α21 | β21 | γ21 | δ21 | 120 | P-BOARD REPAIR |
| 1022 | α21 | β22 | γ21 | δ22 | 156 | ... |
| ... | ... | ... | ... | ... | ... | ... |
| 1031 | α31 | β31 | γ31 | δ31 | 130 | ... |
| 1032 | α31 | β32 | γ32 | δ32 | 181 | ... |
| ... | ... | ... | ... | ... | ... | ... |

# EQUIPMENT INSTALLATION SUPPORT SYSTEM

CROSS-REFERENCE TO RELATED APPLICATIONS

This application is a continuation application of International application PCT/JP2018/013374 which claims priority under 35 U.S.C. § 119(a) to Japanese Patent Application No. 2017-069904, filed in Japan on Mar. 31, 2017, the entire contents of which are hereby incorporated herein by reference.

BACKGROUND

Field of the Invention

An equipment installation support system for supporting installation of pieces of equipment in a building Background Information Conventionally, installation tasks, such as mounting and network settings, for pieces of equipment, which are shipped from factories to buildings at sites and mounted in the buildings where trial runs and the like are conducted at the installation time, take much time to complete. Examples of such equipment include air-conditioning equipment. For example, Japanese Unexamined Patent Application Publication No. 2008-215760 describes a technique for using piping and wiring information concerning a pipe system in a building to reduce installation errors on piping and wiring during installation of air-conditioning equipment in the building.

SUMMARY

An equipment installation support system according to a first aspect is an equipment installation support system for supporting setting of a plurality of pieces of equipment intended to be installed in a plurality of buildings. The equipment installation support system includes a plurality of recording tools, each being assigned to one of the plurality of pieces of equipment and having recorded thereon information concerning the assigned equipment, and a server having a configuration to manage the plurality of pieces of equipment. The plurality of pieces of equipment include a specific piece of equipment that is intended to be installed in a specific building among the plurality of buildings and has a configuration to adjust a room environment of the specific building. The plurality of recording tools include a specific recording tool assigned second identification information that is assigned to the specific piece of equipment and identifies the specific piece of equipment from pieces of equipment other than the specific piece of equipment. The server is configured to construct a first database in which first identification information identifying the specific building from buildings other than the specific building, the second identification information, and installation information concerning installation in the specific building are associated with one another. The installation information includes at least one of first installation information indicating a setting position of the specific piece of equipment in the specific building, second installation information indicating a direction of the specific piece of equipment after installation, third installation information indicating an attribute of an installation area in which the specific piece of equipment is to be installed, and fourth installation information indicating a use of a room space for which a room environment is adjusted by the specific piece of equipment.

In the equipment installation support system according to the first aspect, the specific recording tool assigned to the specific piece of equipment has recorded thereon the second identification information. Thus, installation tasks, such as checking the setting position of the specific piece of equipment in the specific building, checking the direction after installation, installing the specific piece of equipment in accordance with the attribute of the installation area, and installing the specific piece of equipment in accordance with the uses of the room space, can be performed by, for example, accessing the server in a period from the manufacturing to the completion of installation, while utilizing the first database by using the second identification information.

BRIEF DESCRIPTION OF THE DRAWINGS

FIG. 3 is a table illustrating an example of an installation database constructed by a server.

FIG. 25 is a table illustrating an example of a research database constructed by the server.

DETAILED DESCRIPTION OF EMBODIMENT(S)

First Embodiment (1) Overall Configuration

Figure 1:
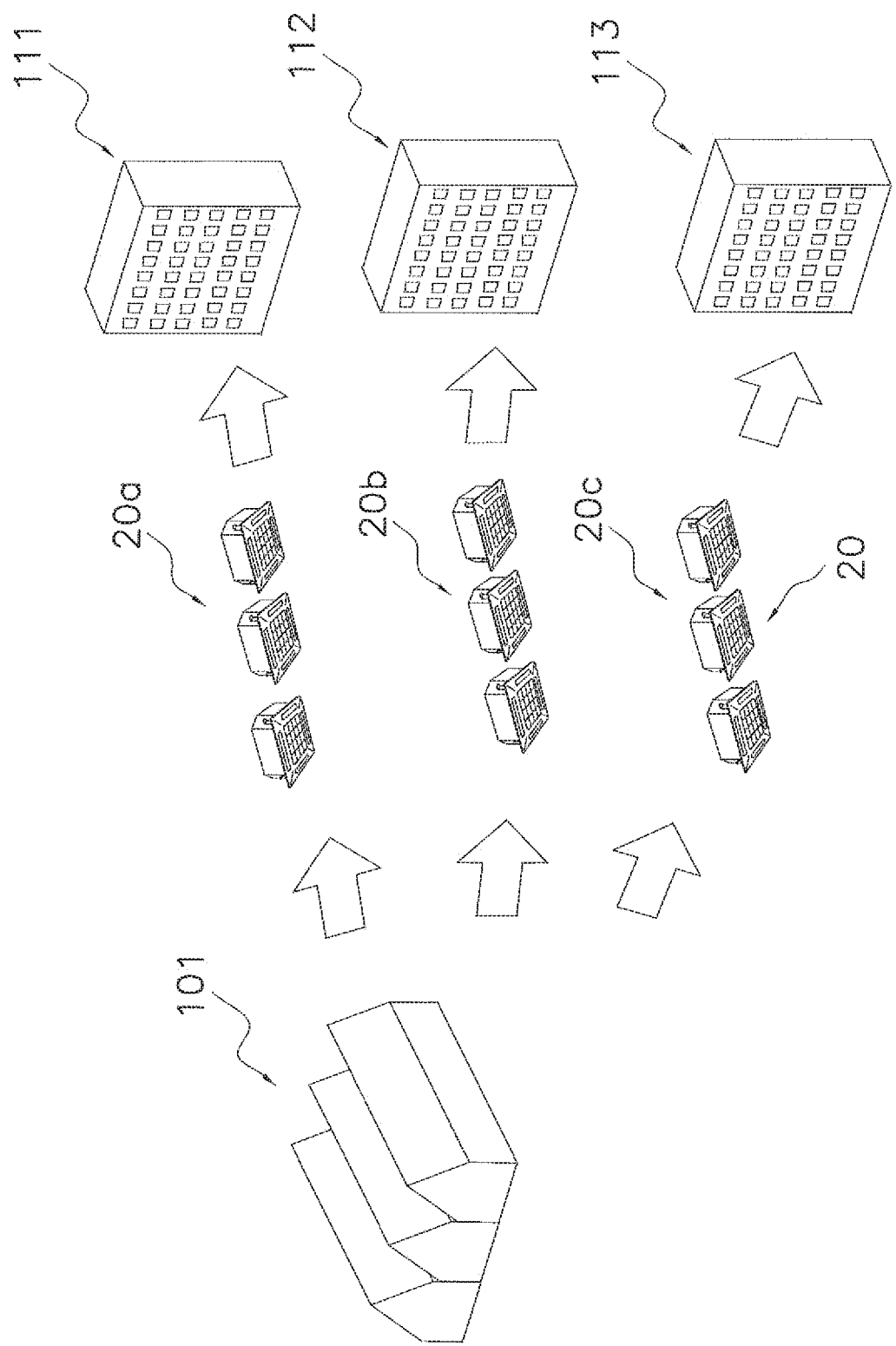
FIG. 1 is a conceptual diagram illustrating an example of a plurality of indoor units that are installed in a plurality of buildings.

A plurality of pieces of equipment manufactured in a factory and shipped to a plurality of buildings will be described, taking as an example an indoor unit of an air conditioner manufactured in the factory and pieces of equipment (a Wi-Fi access point B and a Wi-Fi unit) related to the indoor unit. As illustrated in FIG. 1, a plurality of indoor units 20 manufactured in a factory 101 are shipped to a plurality of buildings 111 to 113. The plurality of indoor units 20 are intended to be installed in the buildings 111 to 113.

The indoor units 20 are, for example, of a ceiling-mountable type and are intended to be installed in such a manner as to be embedded in the ceiling of specific rooms in specific floors of the buildings 111 to 113 (here, three buildings). The plurality of buildings 111 to 113 need not be constructed in the same region and may be buildings constructed in different countries, for example. For example, the building 111 may be constructed in the United State, the building 112 may be constructed in Japan, and the building 113 may be constructed in the United Kingdom. Of course, the buildings 111 to 113 may be constructed in different regions or locations in the same country.

Among the indoor units 20, a plurality of indoor units 20a are shipped to the building 111, a plurality of indoor units 20b are shipped to the building 112, and a plurality of indoor units 20c are shipped to the building 113. Assuming that the building 111 is a specific building, the plurality of indoor units 20a are specific pieces of equipment. Assuming that the building 112 is a specific building, the plurality of indoor units 20b are specific pieces of equipment. Assuming that the building 113 is a specific building, the plurality of indoor units 20c are specific pieces of equipment. Here, each specific piece of equipment is a piece of equipment having a configuration to adjust a room environment of a specific building. For example, a specific indoor unit 20a among the plurality of indoor units 20a is installed in a specific room in the building 111, which is a specific building. The indoor unit 20a adjusts the room environment, such as room temperature, of the room in which the indoor unit 20a is installed.

Installation support using an equipment installation support system 1 that supports installation of such an air conditioner will be described, taking, as an example, support of installation of a plurality of pieces of equipment, namely, the plurality of indoor units 20b, Wi-Fi access points 70A and 70B, and Wi-Fi units 80A and 80B illustrated in FIG. 12. The equipment installation support system 1 includes a server 30. The equipment installation support system 1 further includes, as recording tools, built-in memories 22, 72, and 82 of the plurality of indoor units 20, the Wi-Fi access points 70A and 70B, and the Wi-Fi units 80A and 80B (see FIG. 6, FIG. 7, and FIG. 8). Each recording tool is an item having recorded thereon information so that the information can be read by a reading device. The recording tool includes a recording device and a recording medium. The recording device includes a storage unit (memory). The recording medium includes a visual indicator. The visual indicator includes, for example, a sticker having a code image printed on a surface thereof.

Construction of Database

Figure 2:
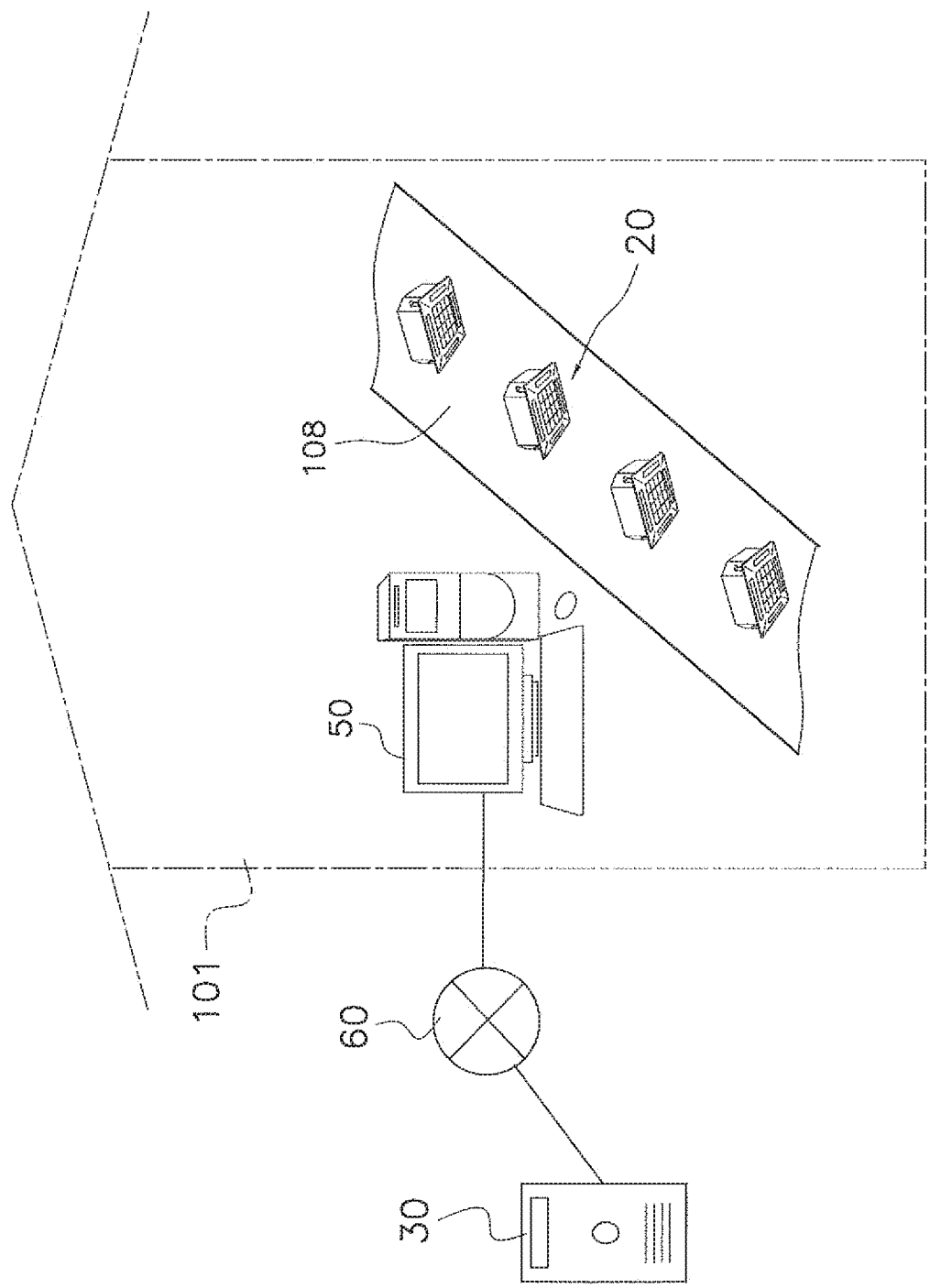
FIG. 2 is a conceptual diagram for describing construction of an installation database and writing of data in a factory according to a first embodiment.

FIG. 2 conceptually illustrates how the indoor units 20 are manufactured in the factory 101. The factory 101 includes a production line 108 for the indoor units 20, and an input device 50 for inputting data concerning the indoor units 20 to the server 30. The input device 50 is connected to the server 30 via, for example, a public line 60. The data input from the input device 50 is transmitted to the server 30 via the public line 60. While the server 30 is described here to be disposed outside the factory 101, the server 30 may be disposed within the factory 101.

Figure 4:
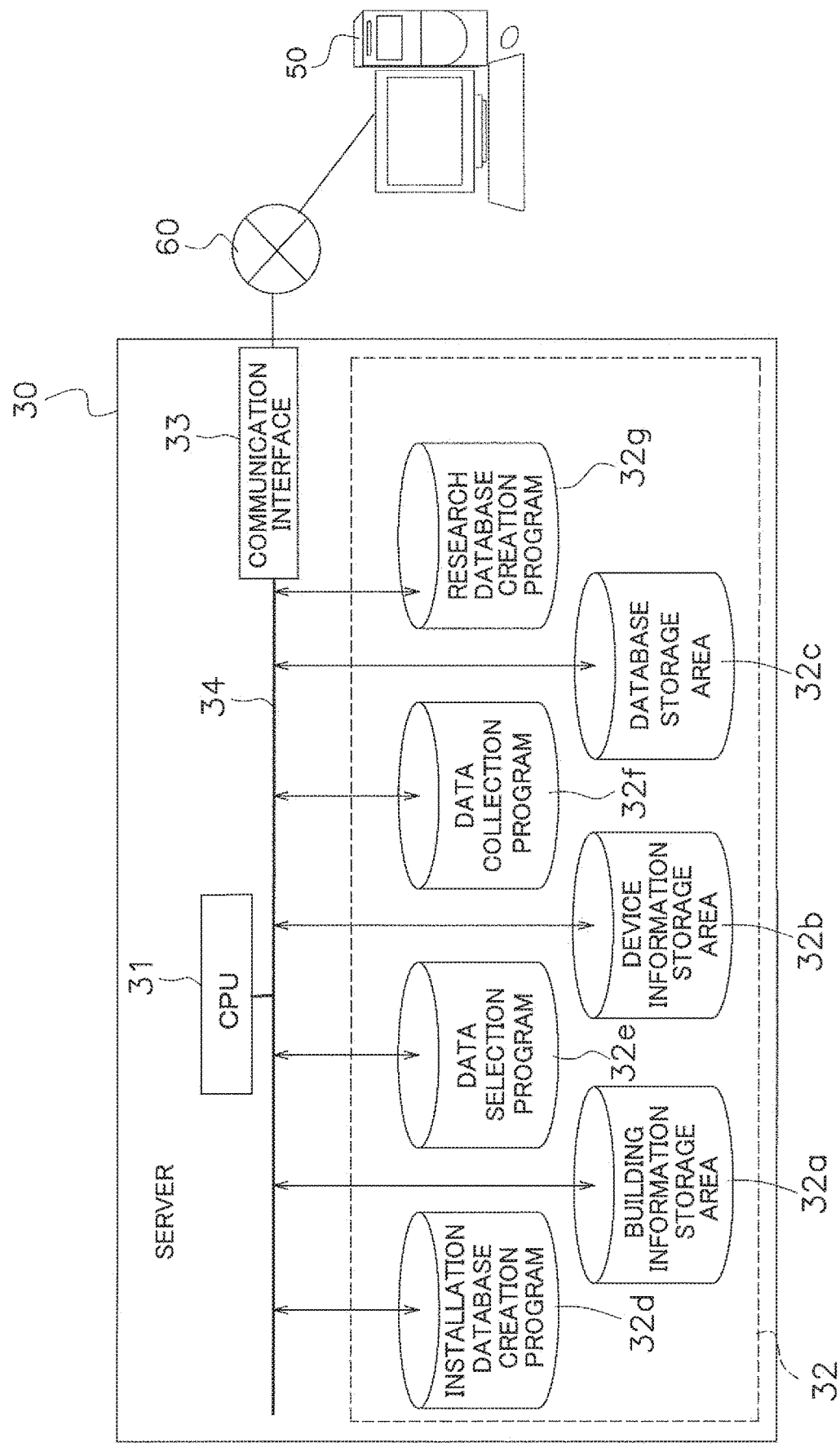
FIG. 4 is a block diagram illustrating an example configuration of the server.

FIG. 4 illustrates an example configuration of the server 30. The server 30 illustrated in FIG. 4 includes a CPU (central processing unit) 31, a memory 32, a communication interface 33, and a bus 34 that connects the CPU 31, the memory 32, and the communication interface 33 to one another. Data transmitted and received between the CPU 31, the memory 32, and the communication interface 33 is exchanged through the bus 34.

Figure 5:
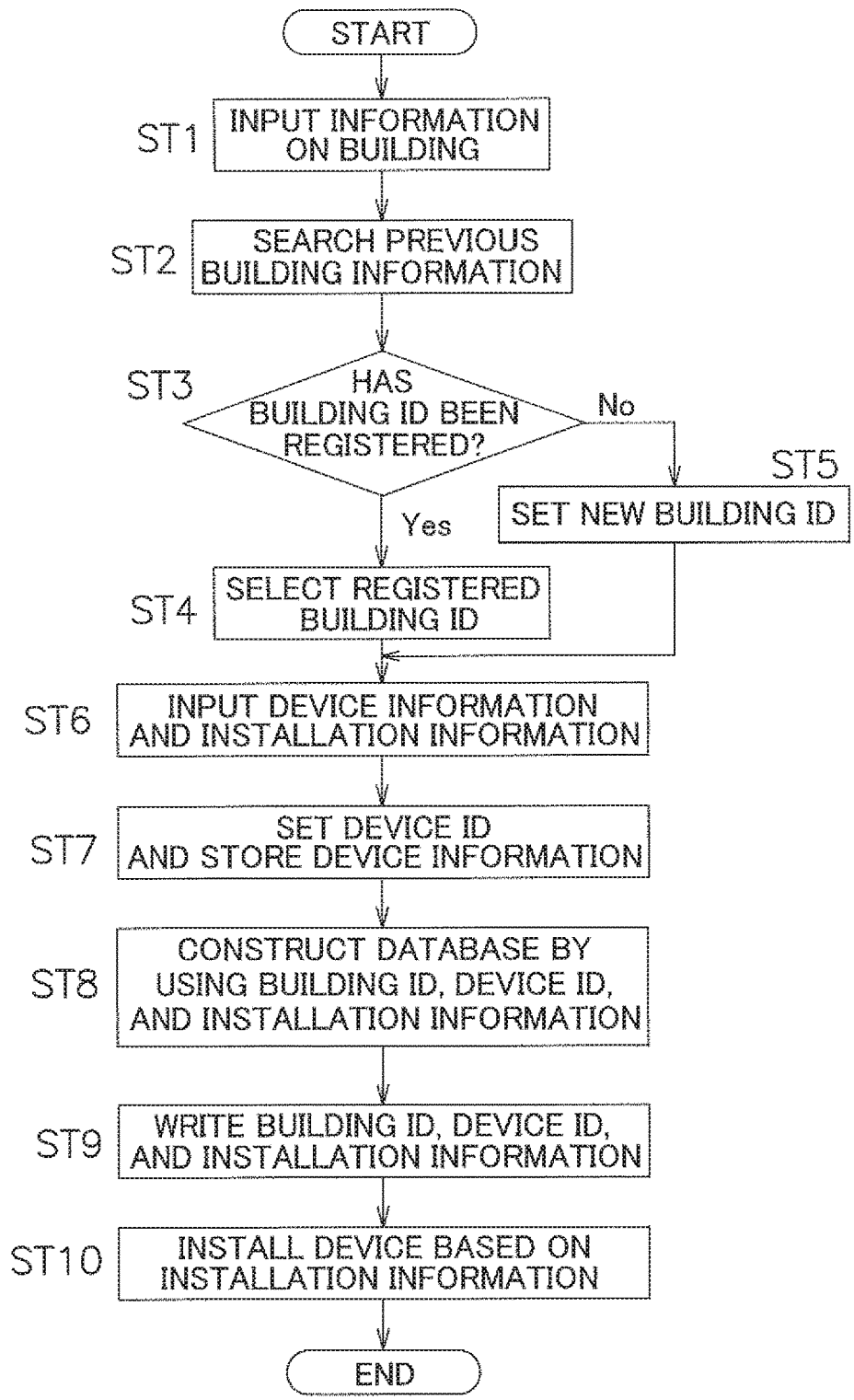
FIG. 5 is a flowchart illustrating an example of task steps performed in an equipment installation support system.

The server 30 constructs a database such that installation information is associated with the building IDs (identification data) and device IDs described above. FIG. 3 illustrates an example concept of an installation database 36 in table form. FIG. 5 illustrates an example procedure for the construction of the installation database 36 by the server 30. The following description will be given, assuming that the installation database 36 illustrated in FIG. 3 for the indoor units 20 is manufactured in the single factory 101, with numbers representing serial numbers given in production order.

Information on a building in which the indoor units 20 are intended to be installed is input to the server 30 by using the input device 50 (step ST1). The information on the building, which is input from the input device 50, may be information on a building corresponding to the indoor units 20 that are to be manufactured, information on a building corresponding to the indoor units 20 that are being manufactured, or information on a building corresponding to the indoor units 20 that have been manufactured. For example, a specific indoor unit 20 among the indoor units 20 is intended to be installed in Building X. In this case, information on Building X (building), examples of which include the address and name of the building and the internal arrangement of the building, such as the number of floors, for example, 36 stories above ground and three stories underground, and the layout of rooms in each floor, is input by using the input device 50.

The server 30 sets building IDs for the plurality of buildings 111 to 113. For example, the server 30 sets building ID α1 for the building 111, building ID α2 for the building 112, and building ID α3 for the building 113 (steps ST2 to ST5). If the building 111 is regarded as a specific building, the building ID α1 is first identification information identifying the building 111, which is a specific building among the plurality of buildings 111 to 113, from the buildings 112 and 113, which are non-specific buildings. If the building 112 is regarded as a specific building, the building ID α2 is first identification information identifying the building 112, which is a specific building among the plurality of buildings 111 to 113, from the buildings 111 and 113, which are non-specific buildings.

The CPU 31 of the server 30 searches previous building information by using a building information storage area 32a stored in the memory 32 (step ST2). The building information storage area 32a also stores building IDs.

The CPU 31 compares the input building information with the stored building information. If a building ID has already been registered for the building ("Yes" in step ST3), the CPU 31 selects the registered building ID (step ST4). For example, when a match is found for the input address and name of the building, the server 30 selects the building ID of the building having the matching address and name as the building ID of the building in which the specific indoor unit 20 is intended to be installed. If the building information input from the input device 50 does not match information on any of the buildings whose building IDs have been registered ("No" in step ST3), the server 30 sets a new building ID (step ST5).

Then, installation information for installing the indoor units 20 in the building is input to the server 30 by using the input device 50 together with device information of the indoor units 20 (step ST6). The device information and installation information of the indoor units 20, which are input from the input device 50, may be those of the indoor units 20 that are to be manufactured, the indoor units 20 that are being manufactured, or the indoor units 20 that have been manufactured.

The device information includes, for example, information concerning a type of pieces of equipment, such as indicating that the indoor units 20b are of a wall-mountable type, a ceiling-mountable type, a ceiling-suspended type, or a floor-mountable type, information concerning specifications (spec) of a piece of equipment, such as information concerning the shape, configuration, dimensions, and performance, and so on.

For describing installation information input by using the input device 50, it is assumed here that the indoor units 20b are specific pieces of equipment and the building 112 is a specific building. The installation information input by using the input device 50 includes at least one of first installation information, second installation information, third installation information, and fourth installation information. The first installation information is information indicating setting positions of the indoor units 20b (specific pieces of equipment) in the building 112 (specific building). The information indicating the setting positions is, for example, information indicating locations in a building, such as "locations each at a distance of 1 m from the north and south walls below the ceiling of room 501 on the fifth floor of Building X". For example, the information indicating the setting positions may be written in characters or may be CAD (Computer Aided Design) information indicating the positions on a drawing of the building 112. The first installation information may include the positions of peripheral devices. For example, the positions of blow-out ducts of the indoor units 20b may be included. The second installation information is information indicating the directions of the indoor units 20b (specific pieces of equipment) after installation. The information indicating the directions after installation is, for example, information indicating the orientations of the indoor units 20b such that the four blow-out ports of each of the indoor units 20b are directed north, south, east, and west. The information indicating the directions after installation may also be written in characters or may be CAD information indicating directions. The third installation information is information indicating the attribute of an installation area in which the indoor units 20b (specific pieces of equipment) are installed. For example, the information indicating the attribute of the installation area is information indicating the feature of the installation area, such as a perimeter zone that is an outer periphery portion on an architectural plan drawing where the indoor units 20b are susceptible to changes in outside conditions or an interior zone that is a center portion on the architectural plan drawing where the indoor units 20b are less susceptible to changes in outside conditions. The information indicating the directions after installation may also be written in characters or may be CAD information indicating directions. The fourth installation information is information indicating the uses of room spaces for which room environments are adjusted by the indoor units 20b (specific pieces of equipment). For example, the information indicating the uses is information indicating the uses of rooms where the indoor units 20b are installed, such as an office, a guest room, a server room, an executive room, or a kitchenette. The information indicating the uses may also be written in characters or may be CAD information.

Upon receipt of input of device information about an indoor unit 20, the CPU 31 sets a device ID (step ST7). Then, the CPU 31 stores, in a device information storage area 32b of the memory 32, the device information of the indoor unit 20, including the device ID, in association with the device ID and a previously set or selected building ID (step ST7). The device information storage area 32b stores, for example, a building ID and a device ID together. The device ID is second identification information identifying a specific piece of equipment from the other pieces of equipment. If device IDs set for the plurality of indoor units 20b are used, the plurality of indoor units 20b are identified from the plurality of other indoor units 20a and 20c. In addition, the device IDs set for the plurality of indoor units 20b are used to identify the plurality of indoor units 20b from each other. As described below, the server 30 also sets device IDs for the Wi-Fi access points 70A and 70B and the Wi-Fi units 80A and 80B. The Wi-Fi access points 70A and 70B and the Wi-Fi units 80A and 80B illustrated in FIG. 12 do not correspond to specific pieces of equipment having a configuration to adjust the room environment of the building 112 (specific building), but correspond to pieces of equipment that are installed in the specific building since they are used without being brought outside the area where they are installed (for example, the room where they are installed).

The CPU 31 activates an installation database creation program 32d stored in the memory 32 to construct the installation database 36 by using a building ID, a device ID, and installation information (step ST8). For example, the CPU 31 repeatedly writes a building ID, a device ID, and installation information, which are related to one another, in the same record (row) to create the table illustrated in FIG. 3 in accordance with the installation database creation program 32d. For example, for record No. 1001, α1 is written in column CL1 as a building ID, β1 is written in column CL2 as a device ID, γ1 is written in column CL31 of column CL3 as an SSID, and δ1 is written in column CL32 of the column CL3 as an installation location. The operation described above is repeatedly performed to construct the installation database 36. The constructed installation database 36 is stored in a database storage area 32c of the memory 32.

Recording of Data Using Database

Figure 6:
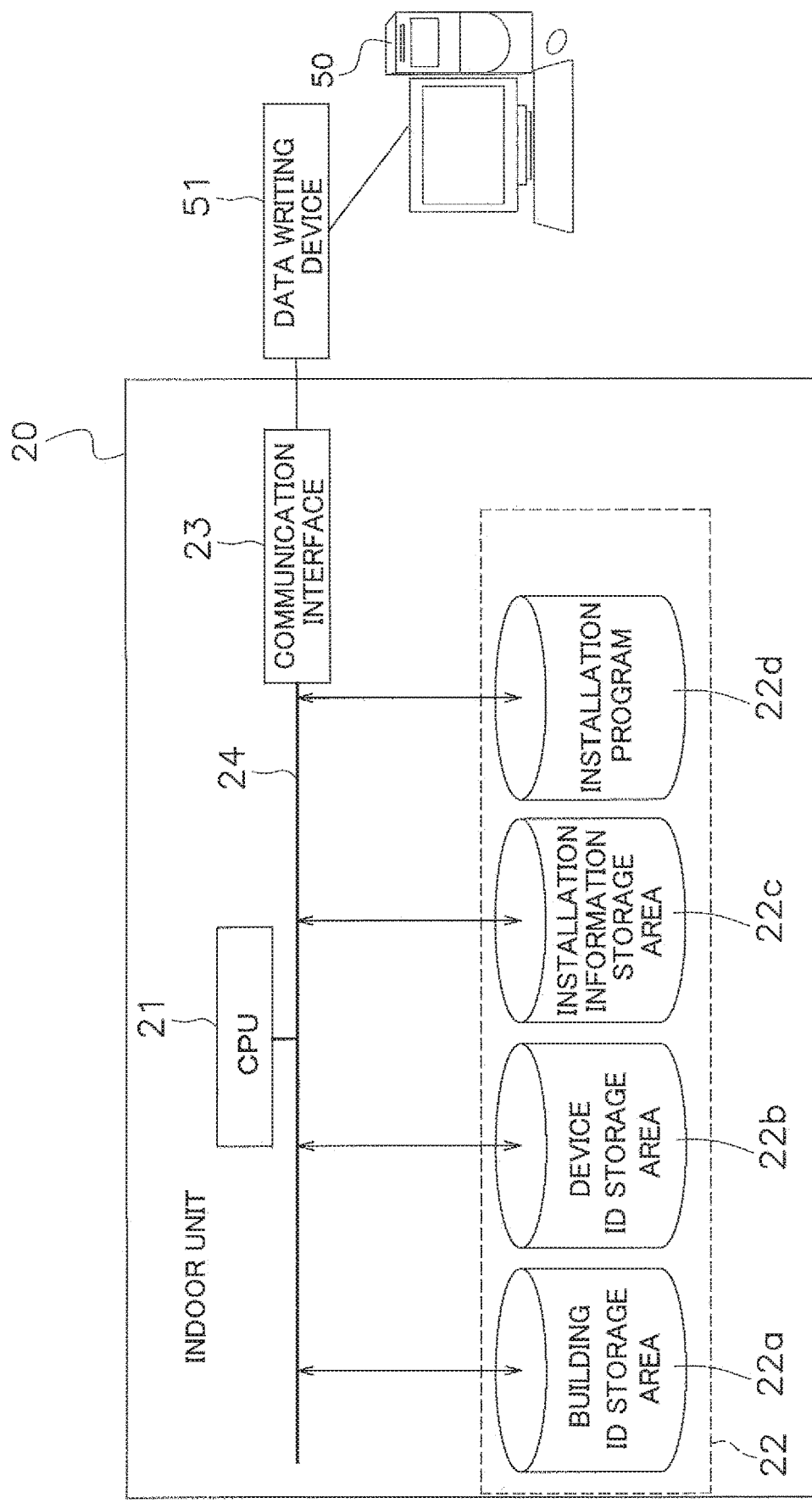
FIG. 6 is a block diagram illustrating an example configuration of an indoor unit for use in the equipment installation support system.

FIG. 6 illustrates an example configuration of each of the indoor units 20 for which installation can be supported by the equipment installation support system 1. The indoor unit 20 includes a CPU 21, a memory 22, a communication interface 23, and a bus 24 that connects the CPU 21, the memory 22, and the communication interface 23 to one another. Data transmitted and received between the CPU 21, the memory 22, and the communication interface 23 is exchanged through the bus 24.

The input device 50 reads information in the installation database 36 from the server 30 and transmits a building ID, a device ID, and installation information from within the read data to a data writing device 51. Transmission from the input device 50 to the data writing device 51 may be performed by a transmission line directly connecting therebetween or via the public line 60. The data writing device 51 transmits the building ID, the device ID, and the installation information to the CPU 21 via the communication interface 23 of the indoor unit 20. The CPU 21 of the indoor unit 20 respectively writes the transmitted building ID, device ID, and installation information to a building ID storage area 22a, a device ID storage area 22b, and an installation information storage area 22c of the memory 22 (step ST9). The writing of step ST9 is performed, for example, before the indoor unit 20 is shipped from the factory. The writing of data to the memory 22 of the indoor unit 20 by the data writing device 51 corresponds to the recording of the data on the indoor unit 20 by using the installation database 36. For example, if the building 112 is regarded as a specific building, the memories 22 of the indoor units 20b are specific storage devices. That is, the memories 22 of the indoor units 20b are specific recording tools each assigned second identification information that is assigned to the indoor units 20b (specific pieces of equipment) to identify the indoor units 20b from the other indoor units 20.

While a case is described here where installation information is also written to the memory 22 of each of the indoor units 20 together with a building ID and a device ID, only a building ID and a device ID may be written, but installation information may not be written, depending on the method of installing the indoor unit 20 described below. Alternatively, only a device ID may be written, but a building ID and installation information may not be written, depending on the method of installing the indoor unit 20 described below.

In the example described above, furthermore, a case has been described where the data writing device 51 simultaneously transmits a building ID, a device ID, and installation information to each of the indoor units 20 for writing. However, a use method may be feasible in which only a device ID is stored in the memory 22 immediately after manufacturing, and, then, before shipment after manufacturing, a building ID and installation information are stored in the memory 22. Another use method may be feasible in which a device ID and a building ID are stored in the memory 22 immediately after manufacturing, and, then, before shipment after manufacturing, installation information is stored in the memory 22. For example, in a case where a building for installation of each of the indoor units 20 is undetermined immediately after manufacturing, and the building for installation is determined when the indoor unit 20 is kept in the factory after manufacturing, the server 30 may construct the installation database 36 at the time when the building for installation is determined, and the data writing device 51 may later store the building ID and installation information in the memory 22 of the indoor unit 20 while performing matching based on the device ID. In a case where in which room of the building for installation the indoor unit 20 is to be installed is undetermined immediately after manufacturing, and the room in which the indoor unit 20 is to be installed is determined when the indoor unit 20 is kept in the factory after manufacturing, the server 30 may construct the installation database 36 at the time when the room in which the indoor unit 20 is to be installed is determined, and the data writing device 51 may later store the installation information in the memory 22 of the indoor unit 20 while performing matching based on the device ID.

Installation of Indoor Unit 20

After the steps illustrated in FIG. 5 described above, installation information has been written to the memory 22 of each of the indoor units 20 by using the installation database 36. The indoor unit 20 is installed in a specific building for installation. When power is turned on to the indoor unit 20, the indoor unit 20 can automatically perform some of the tasks for installing the indoor unit 20 in a building based on installation information. The indoor unit 20 performs some of the installation tasks on the basis of installation information, thereby reducing the number of man-hours required until the installation of the indoor unit 20 is completed. To perform some of the tasks for installing the indoor unit 20 in a building based on installation information, for example, the indoor unit 20 stores an installation program 22d describing the tasks. When power is turned on to the indoor unit 20 for the first time after installation, the CPU 21 activates the installation program 22d to perform some of the tasks for installing the indoor unit 20 in the building.

(2) Specific Example of Installation Tasks (2-1) Conditions of Specific Structure A description will be given here of devices 121 that are installed in the n-th floor (n is a natural number) and devices 122 that are installed in the (n+1)-th floor (n is a natural number) of the building 112, where the building 112 is regarded as a specific building. In the description of a specific example of the installation tasks, the devices 121 are assumed to include three indoor units 20b, three Wi-Fi units 80A, and one Wi-Fi access point 70A. The devices 122 are assumed to include four indoor units 20b, four Wi-Fi units 80B, and one Wi-Fi access point 70B.

(2-2) Preparation in Factory

Figure 7:
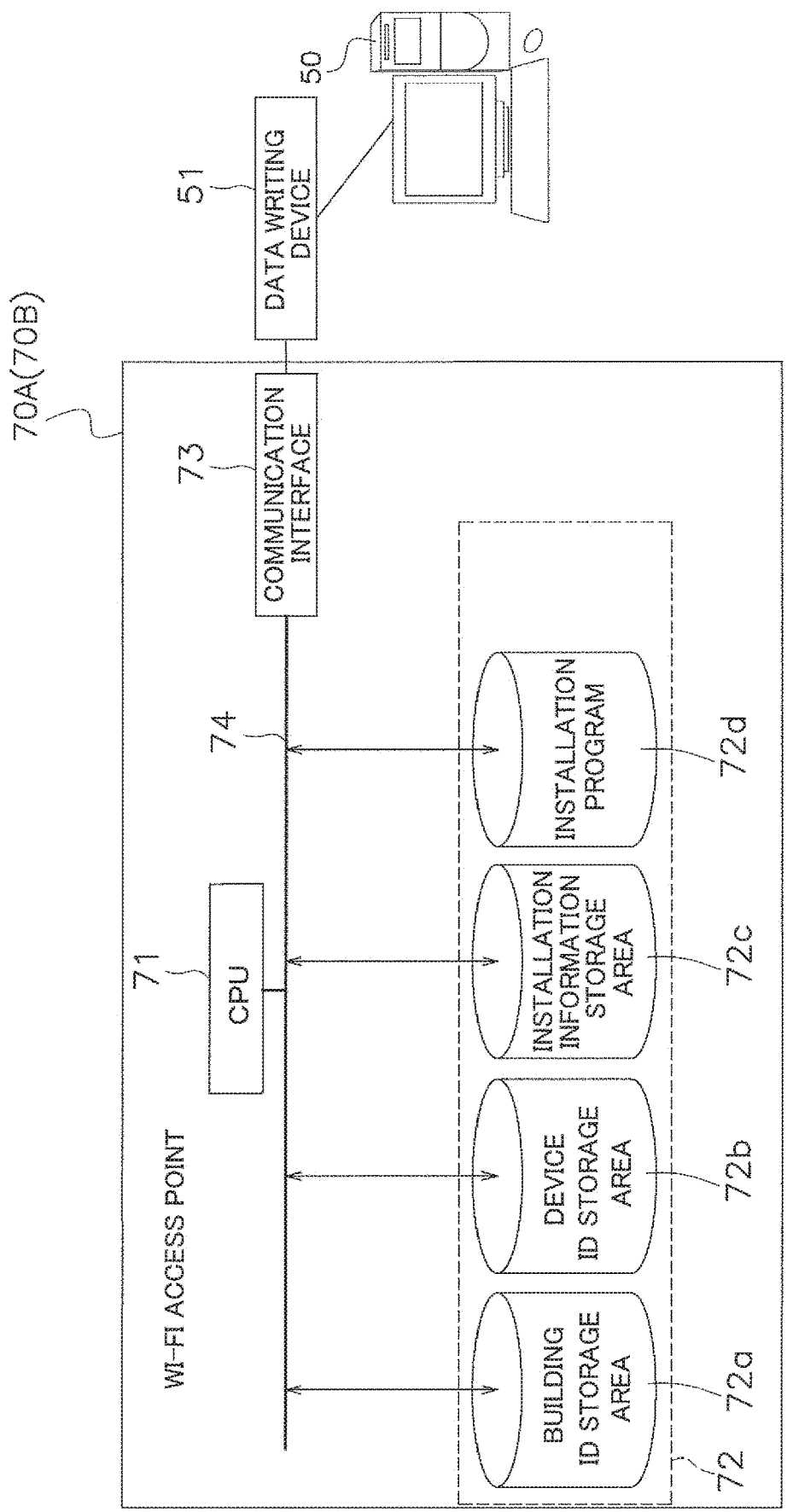
FIG. 7 is a block diagram illustrating an example configuration of a Wi-Fi access point for use in the equipment installation support system.
Figure 8:
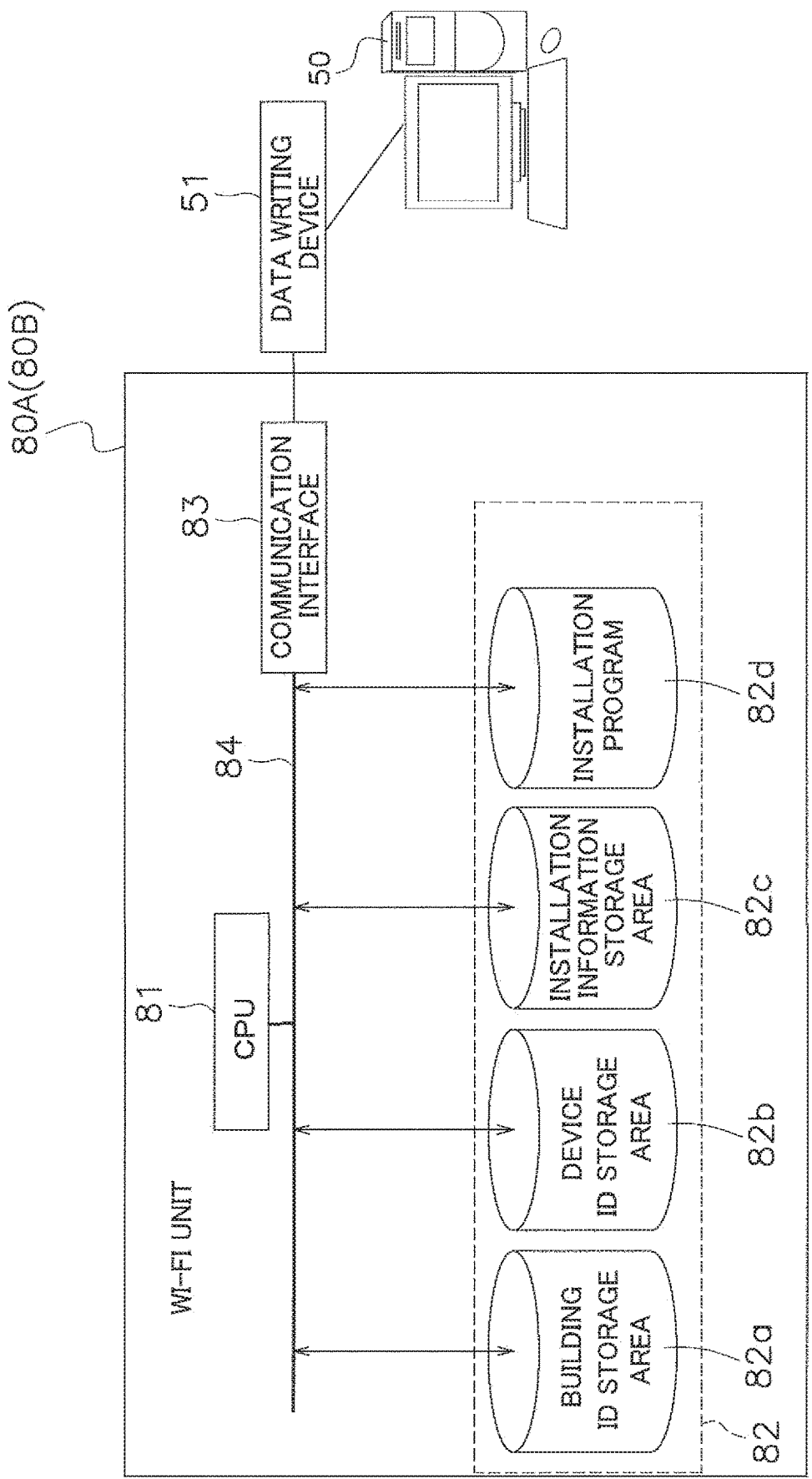
FIG. 8 is a block diagram illustrating an example configuration of a Wi-Fi unit for use in the equipment installation support system.
Figure 9:
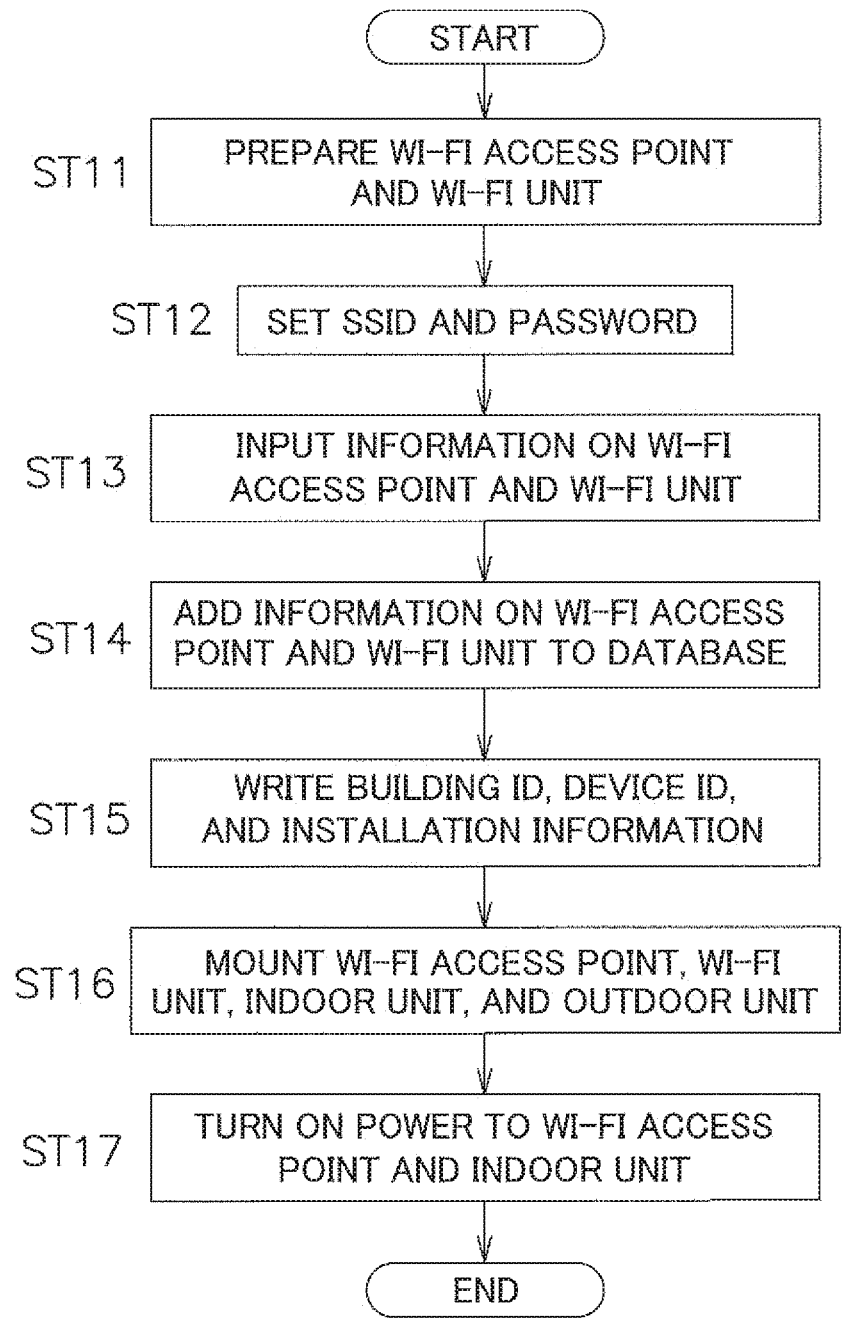
FIG. 9 is a flowchart illustrating a specific example of task steps performed in the equipment installation support system.

Tasks from preparation in the factory to installation in the building 112 will be described in accordance with a flowchart illustrated in FIG. 9. For example, the Wi-Fi access points 70A and 70B and the Wi-Fi units 80A and 80B are prepared in the factory (step ST11). The Wi-Fi access points 70A and 70B and the Wi-Fi units 80A and 80B are included in pieces of equipment that are installed in the building 112 (specific building). As illustrated in FIG. 7, each of the Wi-Fi access points 70A and 70B includes a CPU 71, a memory 72, a communication interface 73, and a bus 74 that connects the CPU 71, the memory 72, and the communication interface 73 to one another. As illustrated in FIG. 8, each of the Wi-Fi units 80A and 80B includes a CPU 81, a memory 82, a communication interface 83, and a bus 84 that connects the CPU 81, the memory 82, and the communication interface 83 to one another. Components of the Wi-Fi access points 70A and 70B and the Wi-Fi units 80A and 80B having the same name as those in the indoor unit 20 have similar functions.

Figure 10:
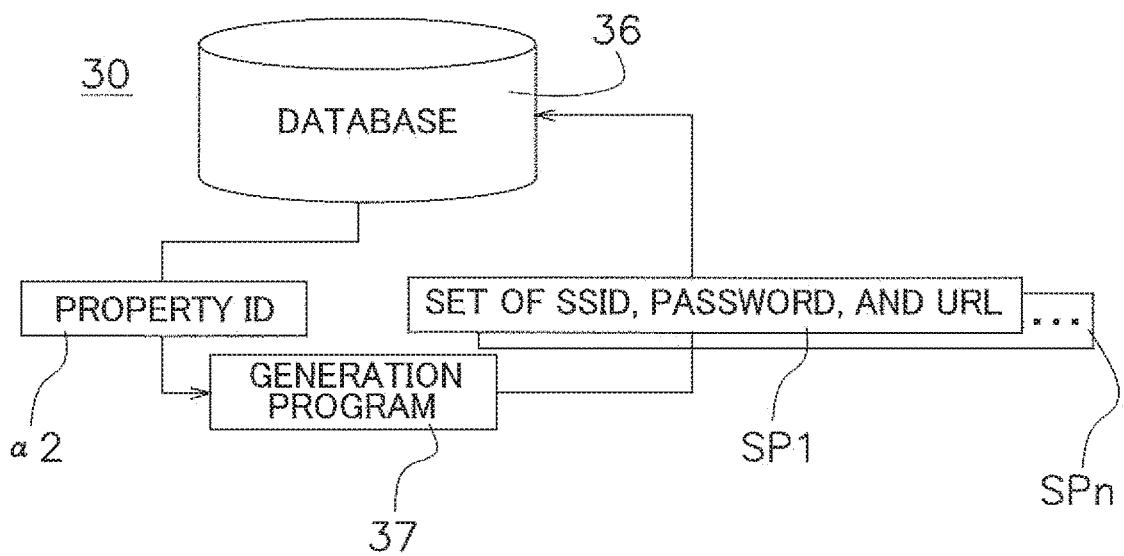
FIG. 10 is a conceptual diagram illustrating an example of the generation of sets, each including an SSID, a password, and a URL.

SSIDs (Service Set Identifiers) and passwords are set for the Wi-Fi access points 70A and 70B and the Wi-Fi units 80A and 80B in, for example, the factory (step ST12). The server 30 has a generation program 37 for setting SSIDs and passwords for the Wi-Fi access points 70A and 70B and the Wi-Fi units 80A and 80B. For example, as illustrated in FIG. 10, the generation program 37 in the server 30 is activated, and the building ID α2 of the specific property (for example, the building 112) is extracted from the installation database 36 stored in the server 30. The generation program 37 generates sets SP1 to SPn, each including an SSID, a password, and a URL (Uniform Resource Locator) of the server 30 to which the indoor units 20b are to be connected, by using a hash function or the like. The number of sets generated by the generation program 37 is the same as the number of Wi-Fi access points 70A and 70B to be supplied to the building 112. The generated sets SP1 to SPn, each including an SSID, a password, the indoor unit 20b, and a URL, are registered as installation information in the installation database 36. The passwords are used to authenticate permission of connection to the Wi-Fi access points 70A and 70B and the Wi-Fi units 80A and 80B.

Here, a case is described where step ST8 illustrated in FIG. 5 has been completed for the indoor units 20b and the indoor units 20b are in a state where a building ID, device IDs, and installation information are to be written to the indoor units 20b in step ST9. In the next stage, information concerning the Wi-Fi access points 70A and 70B and the Wi-Fi units 80A and 80B is input from the input device 50 to the server 30 (step ST13). The information includes, for example, information indicating that the Wi-Fi access points 70A and 70B are to be installed in the n-th floor and (n+1)-th floor of the building 112, information necessary to identify the indoor units 20b to which the Wi-Fi units 80A and 80B are attached, and information concerning the SSIDs and passwords set for the Wi-Fi access points 70A and 70B and the Wi-Fi units 80A and 80B.

The server 30 sets individual device IDs for the Wi-Fi access points 70A and 70B and the Wi-Fi units 80A and 80B, and adds information concerning the Wi-Fi access points 70A and 70B and the Wi-Fi units 80A and 80B to the installation database 36 constructed in step ST8 (step ST14).

Further, the server 30 adds information concerning the Wi-Fi access points 70A and 70B and the Wi-Fi units 80A and 80B to installation information of the indoor units 20b. For example, the installation information in the installation database 36 for the three indoor units 20b, which are intended to be installed in the n-th floor, and information concerning the device IDs of the Wi-Fi units 80A that are set in the same n-th floor are added together. As the information concerning the device IDs of the Wi-Fi units 80A, information only for indoor units 20b intended to be connected to the Wi-Fi units 80A among the three indoor units 20b is added. For example, if an indoor unit 20b and a Wi-Fi unit 80A that are not to be connected are connected, the device ID of the Wi-Fi unit 80A, which is written to the settings information of the indoor unit 20b, does not match the device ID of the connected Wi-Fi unit 80A. The CPU 21 of the indoor unit 20b may be configured to detect such a mismatch and to generate an alert. Likewise, the installation information in the installation database 36 for the four indoor units 20b, which are intended to be installed in the (n+1)-th floor, and information concerning the device IDs of the Wi-Fi units 80B that are set in the same (n+1)-th floor are added together.

The server 30 includes the SSIDs and passwords of the Wi-Fi access points 70A and 70B in the n-th floor and the (n+1)-th floor in the installation information of all of the Wi-Fi units 80A and 80B. It is sufficient to determine which of the Wi-Fi units 80A and 80B is to be combined with each of the Wi-Fi access points 70A and 70B when the indoor units 20b, the Wi-Fi access points 70A and 70B, and the Wi-Fi units 80A and 80B are installed in the building 112. Thus, such combinations may not be determined at the stage of shipment.

Figure 11:
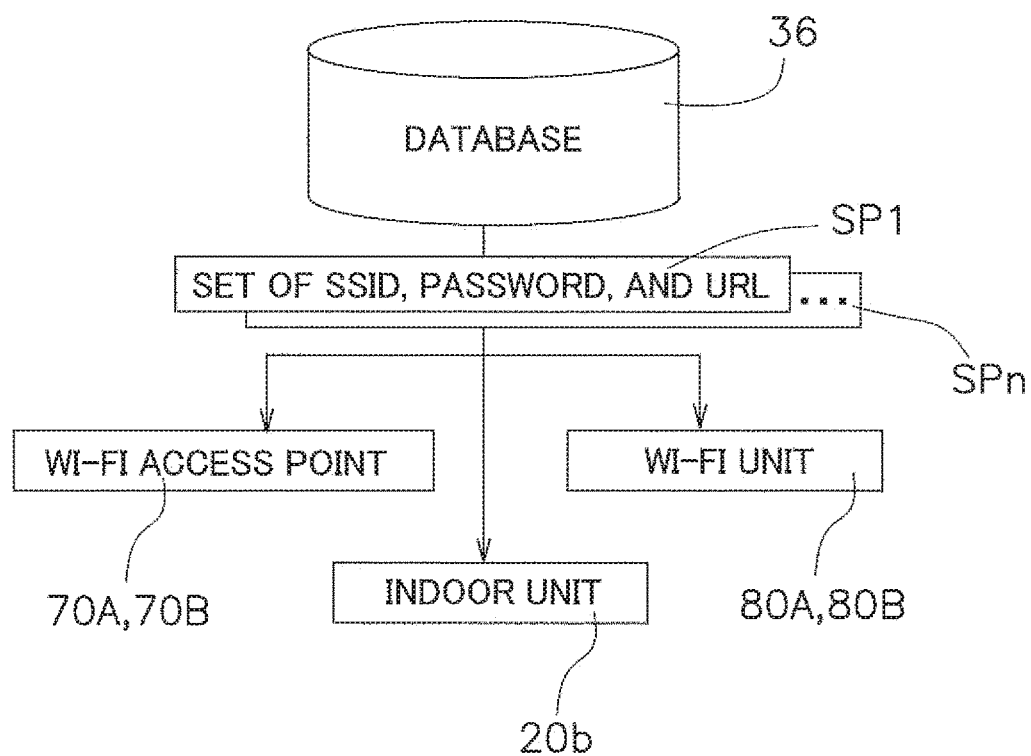
FIG. 11 is a conceptual diagram illustrating an example of the writing of information to devices by using the installation database.

Writing similar to the writing of a building ID, a device ID, and installation information to the indoor units 20b in step ST9 is also performed on the Wi-Fi access points 70A and 70B and the Wi-Fi units 80A and 80B by using, for example, the data writing device 51 (step ST15). Through these writing operations (steps ST9 and ST15), as illustrated in FIG. 11, the plurality of sets, each including an SSID, a password, and a URL, read from the installation database 36 are written to the respective memories 72, 82, and 22 of the Wi-Fi access points 70A and 70B, the Wi-Fi units 80A and 80B, and the plurality of indoor units 20b.

The Wi-Fi access points 70A and 70B and the Wi-Fi units 80A and 80B are shipped from the factory to the building 112 in a way similar to that for the indoor units 20b. The Wi-Fi units 80A and 80B are attached to the indoor units 20b before shipment, for example. An outdoor unit 10 (see FIG. 12) included in an air conditioner is also registered and managed in the installation database 36 in a manner similar to that for the indoor units 20. Accordingly, an air conditioner constituted by the outdoor unit 10 and the plurality of indoor units 20b can be regarded as a specific piece of equipment that is intended to be installed in the building 112 and that adjusts the residential environment of the building 112.

(2-3) Installation in Structure 112

Figure 12:
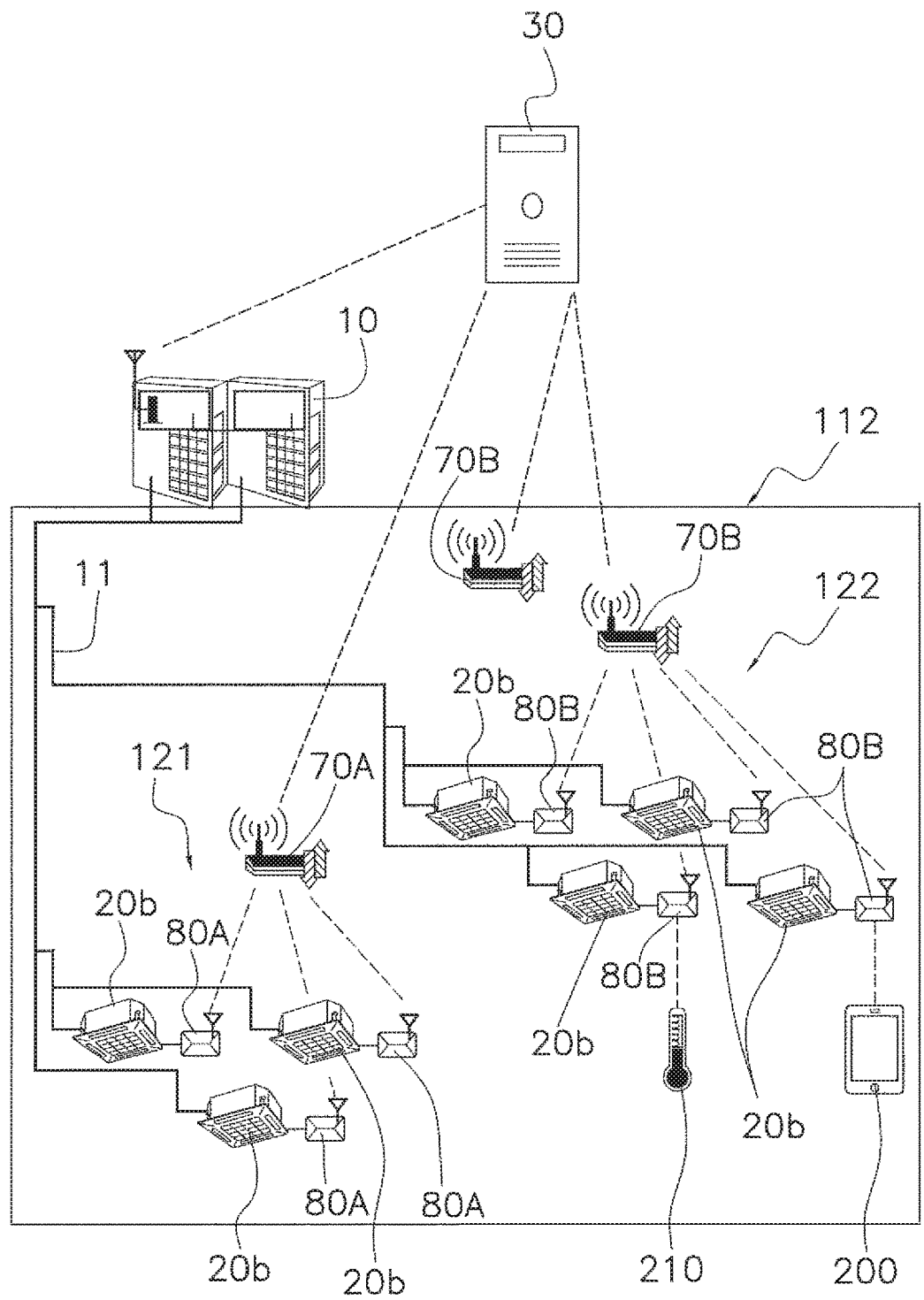
FIG. 12 is a block diagram illustrating an example of a plurality of devices that are installed in a building.

As illustrated in FIG. 12, the outdoor unit 10 and the indoor units 20b are installed at predetermined locations in the building 112 (step ST16), and the indoor units 20b are connected to the outdoor unit 10 by connection pipes 11 to form an air conditioner. Further, the Wi-Fi access points 70A and 70B are further installed at predetermined locations. For example, the Wi-Fi access point 70A is installed in the n-th floor, and the Wi-Fi access points 70B are installed in the (n+1)-th floor (step ST16). The Wi-Fi units 80A and 80B are installed together with the indoor units 20b. Each of the Wi-Fi units 80A and 80B is connected to a corresponding one of the indoor units 20b. For example, one of the Wi-Fi units 80A is connected to one of the indoor units 20b included in the devices 121, and one of the Wi-Fi units 80B is connected to one of the indoor units 20b included in the devices 122. With this connection, the communication interfaces 83 of the Wi-Fi units 80A and 80B function as communication units of the indoor units 20b, which are specific pieces of equipment, and the indoor units 20b are capable of communicating with the Wi-Fi access points 70A and 70B via the Wi-Fi units 80A and 80B.

When the outdoor unit 10, the indoor units 20b, the Wi-Fi access points 70A and 70B, and the Wi-Fi units 80A and 80B are installed, power is turned on to the indoor units 20b. At this time, power has been turned on to the Wi-Fi access points 70A and 70B, and the Wi-Fi access points 70A and 70B have transmitted radio waves and are ready to establish connection with the Wi-Fi units 80A and 80B. Each of the indoor units 20b to which power has been turned on activates the installation program 22d stored in the memory 22. Each of the indoor units 20b in the n-th floor instructs the Wi-Fi unit 80A connected thereto to establish connection with a wireless LAN access point. Upon receipt of the instruction, the Wi-Fi unit 80A activates an installation program 82d in the memory 82 to search for a Wi-Fi access point 70A or 70B whose SSID and password match those in the installation information stored in an installation information storage area 82c. When a plurality of Wi-Fi access points 70A and 70B are found, the Wi-Fi unit 80A establishes a connection with one of the found Wi-Fi access points 70A and 70B having the highest RSSI (Received Signal Strength Indication). Thus, each of the Wi-Fi units 80A has a device or function of detecting RSSI. Each of the Wi-Fi access points 70A and 70B activates an installation program 72d when power is turned on, and then checks a password and configures a connection with a corresponding one of the Wi-Fi units 80A and 80B in accordance with the installation program 72d.

The Wi-Fi units 80A and 80B transmit all the device IDs of the Wi-Fi access points 70A and 70B from which radio waves are received, RSSIs, and used channels to the server 30. The server 30 transmits an appropriate channel selection method to the Wi-Fi access points 70A and 70B on the basis of information transmitted from the Wi-Fi units 80A and 80B. Accordingly, the Wi-Fi access points 70A and 70B select channels in accordance with the channel selection method transmitted from the server 30, thereby preventing channel overlapping. When a plurality of Wi-Fi access points 70A and 70B are present, Wi-Fi frequencies may overlap, resulting in unstable communication. Wi-Fi access points typically have a frequency hopping function so that the frequencies (channels) used do not overlap. However, due to limited non-overlapping channels on each frequency band, it is difficult to completely avoid overlapping of frequencies since, for example, a certain frequency band has only several channels.

Accordingly, a person who performs installation, for example, an installation worker, is only required to turn on power to the Wi-Fi access points 70A and 70B and the indoor units 20b without performing wireless LAN connections one by one, which is performed conventionally. Thus, the equipment installation support system 1 can reduce the number of man-hours for installation tasks performed by an installation worker, compared to the conventional operation of an installation worker to establish connections between the Wi-Fi access points 70A and 70B and the Wi-Fi units 80A and 80B one by one for installation.

(2-4) Operation of Wi-Fi Access Points 70A and 70B After Installation

Each of the Wi-Fi access points 70A and 70B stores, for example, the URL (Uniform Resource Locator) of the server 30 in an installation information storage area 72c of the memory 72 as server connection information. Each of the Wi-Fi access points 70A and 70B automatically connects to the server 30 by using the server connection information in accordance with the installation program 72d, which is activated when power is turned on.

When the found one of the Wi-Fi access points 70A and 70B has an RSSI lower than a predetermined value, each of the Wi-Fi units 80A and 80B searches for one of the Wi-Fi access points 70A and 70B having an RSSI higher than the predetermined value, with also the Wi-Fi access point with the reduced RSSI remaining as a candidate connection destination. If a Wi-Fi access point 70A or 70B having an RSSI higher than the predetermined value is not found within a predetermined time, each of the Wi-Fi units 80A and 80B establishes a connection with one of the found Wi-Fi access points 70A and 70B having the highest RSSI.

If the Wi-Fi access points 70A and 70B are changed during the operation of the air conditioner, the server 30 may lose track of the indoor units 20b. If much time is taken for the server 30 to perform rerouting once the server 30 loses track of the indoor units 20b due to the change of the Wi-Fi access points 70A and 70B, the air conditioner may be terminated abnormally depending on the configuration of the air conditioner. To avoid such abnormal termination, it is preferable that the air conditioner be configured to, after the Wi-Fi units 80A and 80B transmit the device IDs of the Wi-Fi access points 70A and 70B, with which a connection is intended to be established next, to the server 30, switch to the Wi-Fi access points 70A and 70B to be connected. This configuration can reduce or eliminate the time taken for the server 30 to perform rerouting after switching, avoiding abnormal termination of the air conditioner.

(2-5) Example Installation Tasks of Indoor Units 20b in Structure 112

Figure 14:
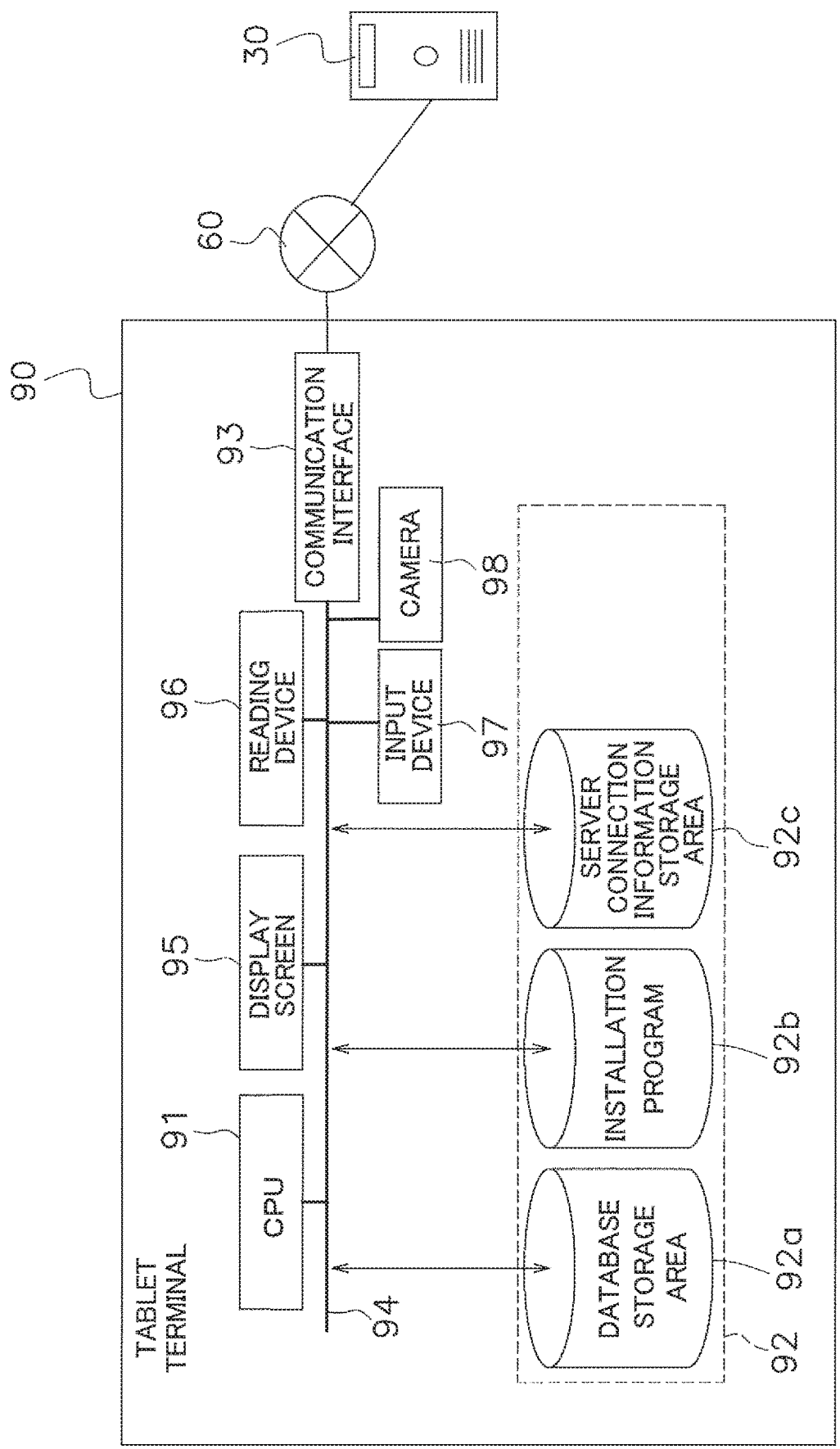
FIG. 14 is a block diagram illustrating an example configuration of a tablet terminal for use in the equipment installation support system.

The equipment installation support system 1 may include a tablet terminal 90 illustrated in FIG. 14 as a smart device. The tablet terminal 90 includes a CPU 91, a memory 92, a communication interface 93, a display screen 95, a reading device 96, an input device 97, a camera 98, and a bus 34 that connects the CPU 91, the memory 92, the communication interface 93, the display screen 95, the reading device 96, the input device 97, and the camera 98 to one another. Data transmitted and received between the CPU 91, the memory 92, the communication interface 93, the display screen 95, and the input device 97 is delivered through the bus 94. The term smart device, as used here, refers to a portable multi-function terminal capable of connecting to the Internet and capable of utilizing various software applications. Examples of the smart device include the tablet terminal 90 described above and smartphones. The input device 97 is, for example, a touch screen. The tablet terminal 90 is configured to be capable of receiving input of character data such as alphabetic and numeric character data by using the input device 97.

An installation worker activates the tablet terminal 90, standing inside or near the building 112. The CPU 91 of the tablet terminal 90 automatically connects to the server 30 in accordance with an installation program 92b stored in the memory 92 by using server connection information stored in a server connection information storage area 92c. The connection to the server 30 is performed via the public line 60 by using the communication interface 93.

For example, the installation worker inputs the building ID of the building 112 to the tablet terminal 90. The installation worker inputs, for example, the building ID stored in the memory 22 of each of the indoor units 20b from the input device 97 of the tablet terminal 90. When the building ID of the building 112 is input, the CPU 91 obtains information related to the building ID (part of the installation database 36, except for information related to the other building IDs) from the installation database 36 in the server 30 and writes the information to a database storage area 92a.

The CPU 91 extracts necessary installation information from the installation database 36 stored in the database storage area 92a in accordance with the installation program 92b. The tablet terminal 90 extracts, for example, first installation information indicating setting positions of the indoor units 20b in the building 112, second installation information indicating the directions of the indoor units 20b after installation, third installation information indicating the attribute of the installation area in which the indoor units 20b are installed, fourth installation information indicating the uses of room spaces for which room environments are adjusted by the indoor units 20b, and so on and displays the extracted information on the display screen 95. The installation worker installs the plurality of indoor units 20b by using the installation information displayed on the display screen 95.

Figure 15:
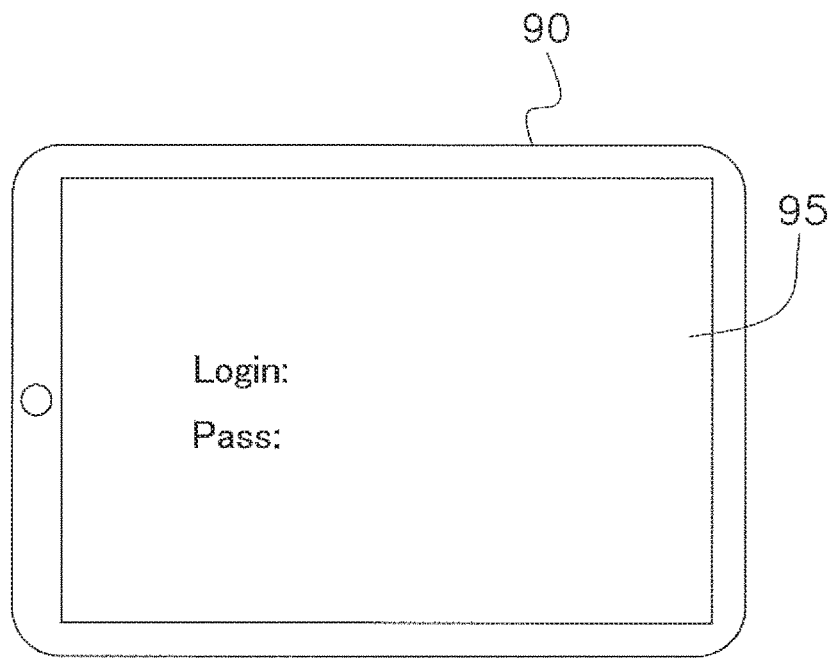
FIG. 15 is a plan view illustrating an example display on the tablet terminal at the time of activation.

As illustrated in FIG. 15, when the tablet terminal 90 is activated, a login image is displayed on the display screen 95 in accordance with the installation program 92b. When the installation worker inputs a correct login password to the tablet terminal 90, communication becomes possible between the tablet terminal 90 and the server 30.

When the installation worker inputs the building ID of the building 112, part of the installation database 36 is downloaded from the server 30 to the tablet terminal 90. Alternatively, the tablet terminal 90 may be provided with a position detection device such as a GPS device and may be configured such that the CPU 91 automatically obtains the address or the like of the building 112. The tablet terminal 90 may be configured to save the installation worker's labor to input information on the building ID of the building 112.

Figure 16:
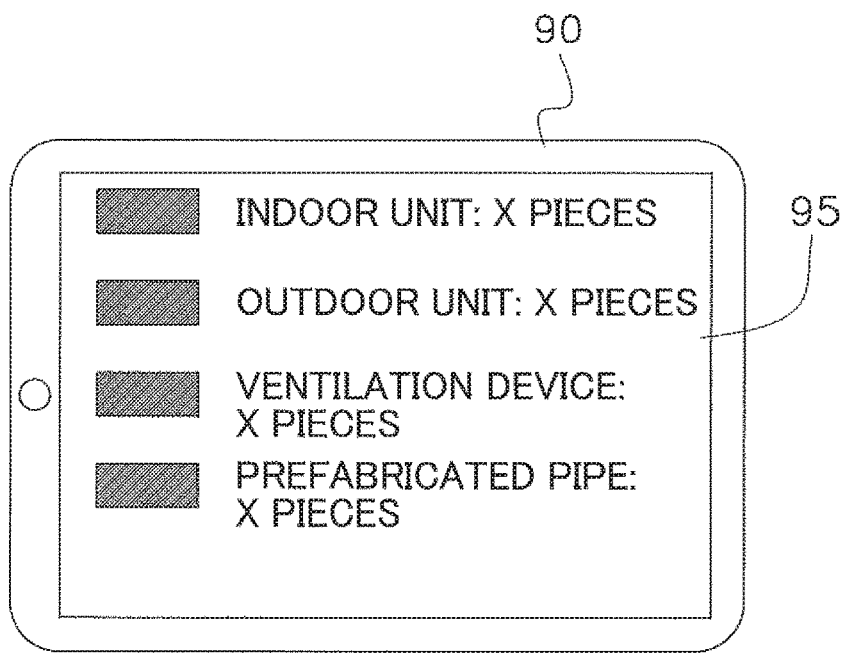
FIG. 16 is a plan view illustrating an example display on the tablet terminal after activation.

When writing the installation database 36 to the database storage area 92a, the CPU 91 displays installation information in the installation database 36 on the display screen 95. For example, as illustrated in FIG. 16, the CPU 91 displays a list of specific pieces of equipment (the indoor units 20b) to be installed on the display screen 95 together with the number of specific pieces of equipment and the device IDs of the specific pieces of equipment. This operation may not be performed on the same day as the day of the tasks, and may be performed on the previous day, for example. The installation worker is able to inspect the delivery of the indoor units 20b while viewing the display screen 95 of the tablet terminal 90 on which the list is displayed.

When the installation worker inputs a device ID to the tablet terminal 90 by using the input device 97 while viewing the device ID, which is printed on, for example, a package of an indoor unit 20b as, for example, numbers, the CPU 91 displays the setting position of the indoor unit 20b on the display screen 95 by using the first installation information corresponding to the device ID. For example, the first installation information includes CAD information of the n-th floor in which the indoor unit 20b is to be installed. The tablet terminal 90 displays on the display screen 95 a sketch of the n-th floor on which the indoor unit 20b is marked using the CAD information. This configuration can save the labor to use the drawing of the building 112 or the like in order to check the setting position of the indoor unit 20b. In addition, if the device information includes image information of the indoor unit 20b, the tablet terminal 90 may be configured to display on the display screen 95 a 3D image of the indoor unit 20b for which installation is completed by synthesis using the CAD information and the image information of the indoor unit 20b to present how the indoor unit 20b is installed in a predetermined room on the n-th floor. The equipment installation support system 1 may further be configured such that the server 30 has an image recognition function and the tablet terminal 90 has a GPS function, such that an image captured by the camera 98 and the position of capturing the image are transmitted from the tablet terminal 90 to the server 30 to allow the server 30 to examine whether the indoor unit 20b has been installed at the correct position by using the device information and the first installation information. Further, the equipment installation support system 1 may be configured such that, after the installation of the indoor unit 20b, the tablet terminal 90 and the indoor unit 20b can communicate with a remote controller (not illustrated) by using the communication interfaces 23 and 93 via, for example, infrared data communication used for communication. Further, the equipment installation support system 1 may be configured to, for example, allow a person who stands near the indoor unit 20b while carrying the tablet terminal 90 to obtain position information of the indoor unit 20b by using the GPS function and to match the position information against the first installation information stored in the indoor unit 20b. That is, the equipment installation support system 1 may be configured such that data transmission between a server, an equipment, and a smart device can be performed in a loop. The equipment installation support system 1 having the configuration described above allows the server 30 or the tablet terminal 90 to examine whether the indoor unit 20b has been installed at the correct position by using the first installation information stored in the indoor unit 20b.

The tablet terminal 90 may be configured to display the direction of the indoor unit 20b after the installation on the display screen 95 by using the second installation information. This configuration can save the labor to use the drawing of the building 112 or the like to check the direction of the indoor unit 20b after the installation. For example, some of the indoor units 20b embedded in the ceiling are of a type having a decorative panel with a substantially square shape when viewed from the bottom and having blow-out ports in four directions. In some cases, it is difficult to determine the direction in which such indoor units 20b are oriented. The equipment installation support system 1 may be configured such that the server 30 has an image recognition function, such that an image of each of the indoor units 20b, which is captured by the camera 98 of the tablet terminal 90, is sent to the server 30 to examine whether the direction of the indoor unit 20b after the installation based on the second installation information and the direction of the indoor unit 20b after the installation determined by image recognition match. Further, the equipment installation support system 1 may be configured to, for example, allow a person who stands on the extension of the line of a specific blow-out port of the indoor unit 20b in the blow-out direction while carrying the tablet terminal 90 to obtain position information of the indoor unit 20b by using the GPS function and to match the position information against the second installation information stored in the indoor unit 20b via communication between the tablet terminal 90 and the indoor unit 20b. The equipment installation support system 1 having the configuration described above allows the server 30 or the tablet terminal 90 to examine whether the direction of the indoor unit 20b after the installation is correct by using the second installation information stored in the indoor unit 20b.

Further, the tablet terminal 90 may be configured to display the attribute of the installation area of the indoor unit 20b on the display screen 95 by using the third installation information. For example, when the installation area of the indoor unit 20b is displayed as a perimeter zone on the display screen 95, if the actual installation area is an interior zone, the installation worker can be made to find an installation error. Further, the equipment installation support system 1 may be configured to, for example, allow a person who stands near the indoor unit 20b while carrying the tablet terminal 90 to obtain position information of the indoor unit 20b by using the GPS function and to match the position information against the third installation information stored in the indoor unit 20*b* via communication between the tablet terminal 90 and the indoor unit 20*b*. The equipment installation support system 1 having the configuration described above allows the server 30 or the tablet terminal 90 to examine whether the attribute of the installation area of the indoor unit 20*b* is correct by using the third installation information stored in the indoor unit 20*b*.

Further, the tablet terminal 90 may be configured to display the uses of room spaces for which room environments are adjusted by the indoor units 20*b* on the display screen 95 by using the fourth installation information. In the case of the indoor units 20*b*, the adjustment of a room space refers to air conditioning of a room, such as cooling, heating, and dehumidification. For example, when the room space whose air conditioning is performed by an indoor unit 20*b* is displayed as a guest room on the display screen 95, if the actual installation area is a meeting room, the installation worker can be made to find an installation error. Further, the equipment installation support system 1 may be configured to, for example, allow a person who stands near the indoor unit 20*b* while carrying the tablet terminal 90 to obtain position information of the indoor unit 20*b* by using the GPS function and to match the position information against the fourth installation information stored in the indoor unit 20*b* via communication between the tablet terminal 90 and the indoor unit 20*b*. The equipment installation support system 1 having the configuration described above allows the server 30 or the tablet terminal 90 to examine whether the uses of a room space whose air conditioning is performed by the indoor unit 20*b* are correct by using the fourth installation information stored in the indoor unit 20*b*.

(2-6) Construction of Research Database for Research and Development

Figure 23:
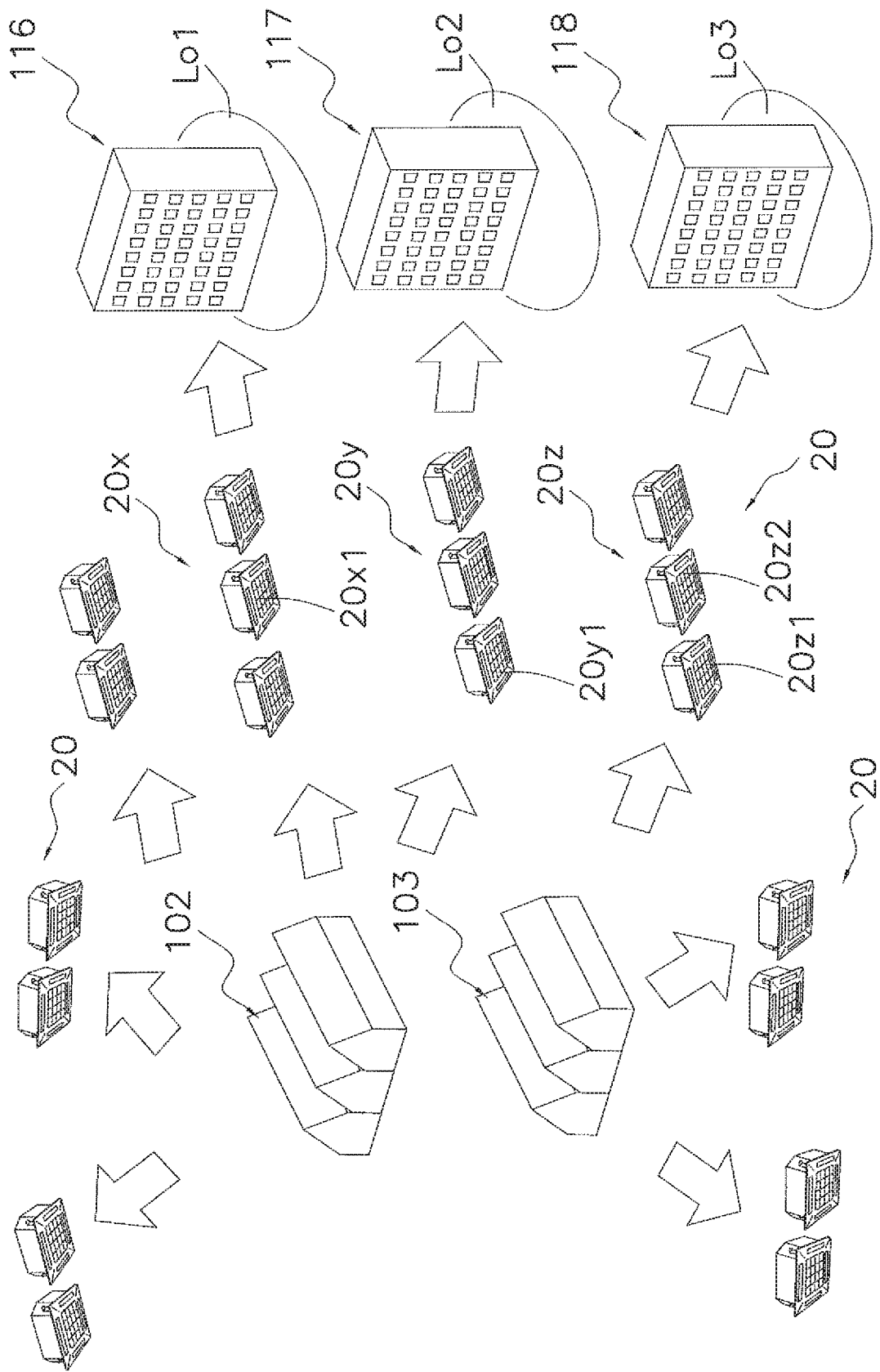
FIG. 23 is a conceptual diagram illustrating another example of a plurality of indoor units that are installed in a plurality of buildings.

Next, the construction of a research database for effective use in research and development will be described. FIG. 23 illustrates indoor units manufactured in a variety of factories, for example, indoor units 20*x* (first specific piece of equipment) manufactured in a factory 102 located in Japan and intended to be installed in a building 116 (first specific building) constructed in a predetermined location Lo1 in New Zealand, indoor units 20*y* (second specific piece of equipment) manufactured in the factory 102 and intended to be installed in a building 117 (second specific building) constructed in a predetermined location Lo2 in Japan, and indoor units 20*z* manufactured in a factory 103 located in Europe and intended to be installed in a building 118 constructed in a predetermined location Lo3 in Europe. All the data obtained during the operation of a large number of indoor units manufactured in a variety of factories and intended to be installed in a variety of buildings constructed in a variety of lands is accumulated, whereby various types of data necessary for various types of research and development can be obtained. However, such data is enormous, and a huge cost is required for accumulation. Furthermore, conventionally, accumulated data is selected and analyzed after accumulation, which makes it difficult to make a plan to collect data before pieces of equipment are installed in buildings.

Here, a case will be described as an example where a research is conducted to investigate how transportation by ship affects indoor units after installation by using one indoor unit 20*x*1 among the plurality of indoor units 20*x* and one indoor unit 20*y*1 among the plurality of indoor units 20*y*, where a room in which the indoor unit 20*x*1 is installed and its its ambient conditions, the usage of the room, and so on are very similar to a room in which the indoor unit 20*y*1 is installed and its ambient conditions, the usage of the room, and so on.

Figure 24:
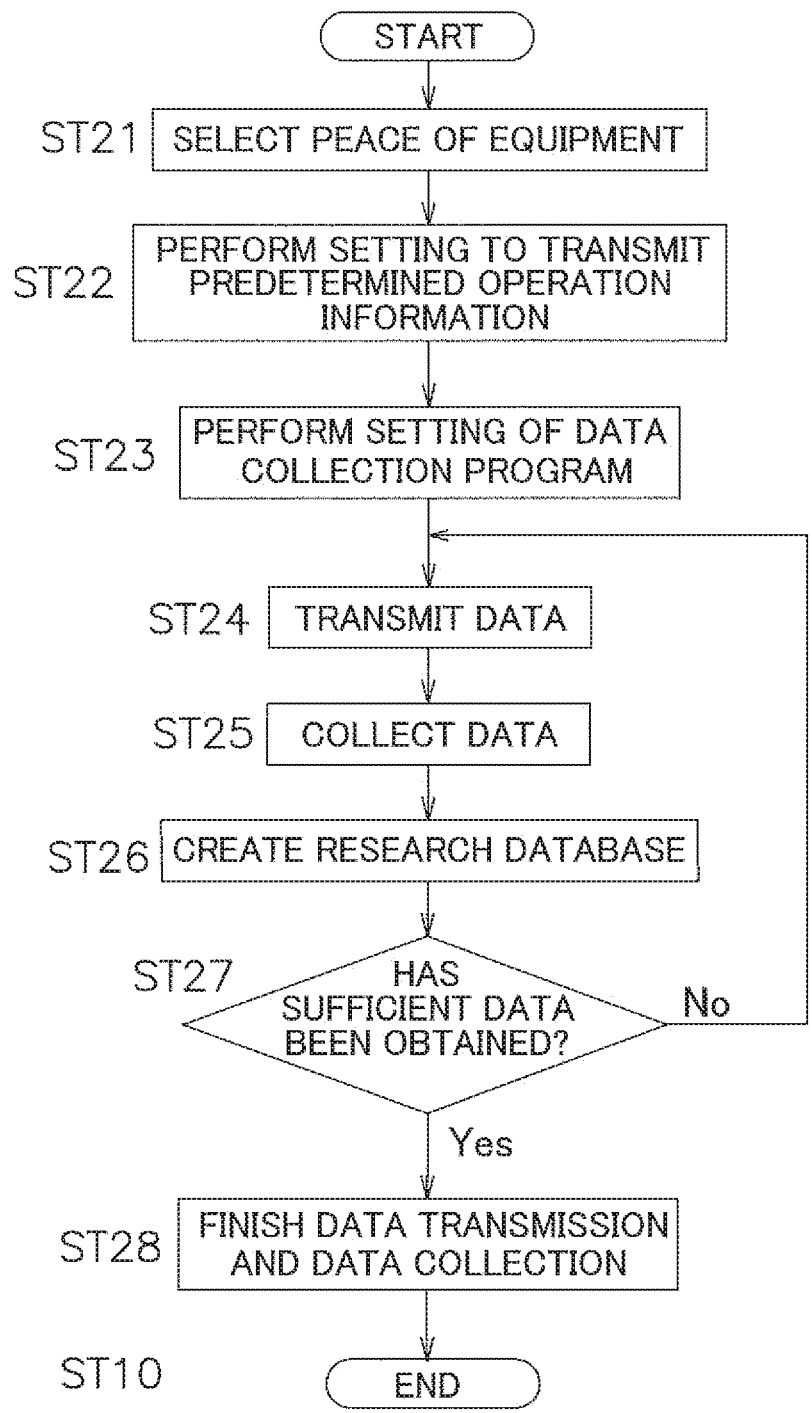
FIG. 24 is a flowchart illustrating another example of task steps performed in the equipment installation support system.

FIG. 24 illustrates an example process flow for constructing a research database 38 illustrated in FIG. 25 by using the server 30 and the installation database 36.

The server 30 has a data selection program 32*e* for searching the installation database 36 and selecting installation information of a piece of equipment suitable for intended research and development. Upon input of an installation condition and/or a device condition for research and development, the server 30 activates the data selection program 32*e* and selects a piece of equipment suitable for research and development (step S21). Here, the indoor units 20*x*1 and 20*y*1, which are suitable for an installation condition and a device condition other than transportation by ship, are selected.

Figure 26:
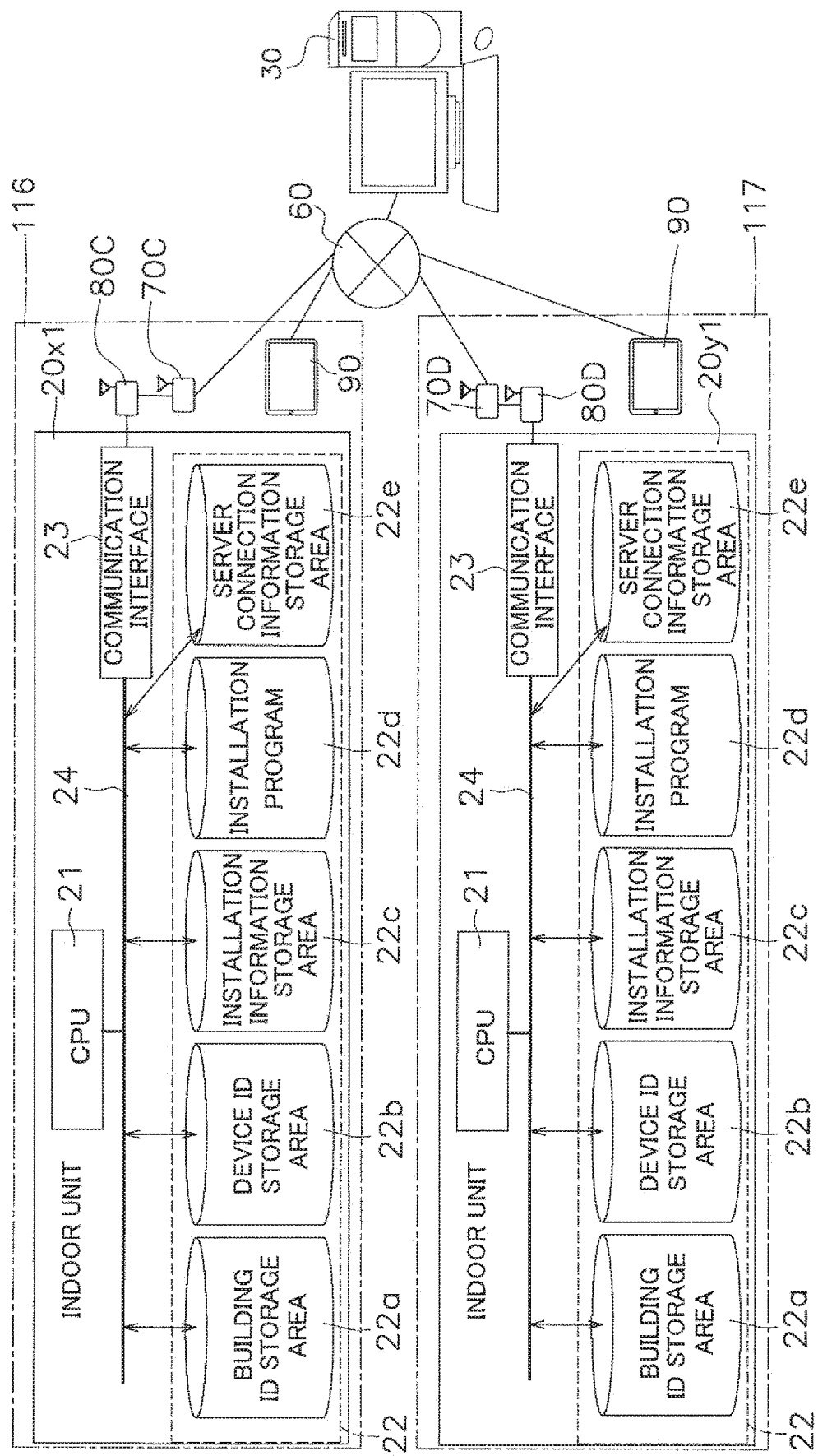
FIG. 26 is a block diagram illustrating another example configuration of indoor units for use in the equipment installation support system.

In each of the selected indoor units 20*x*1 and 20*y*1, as illustrated in FIG. 26, the memory 22 has a server connection information storage area 22*e* that stores server connection information. The indoor units 20*x*1 and 20*y*1 automatically connect to the server 30 via Wi-Fi access points 70C and 70D and Wi-Fi units 80C and 80D by using the server connection information stored in the server connection information storage areas 22*e*, respectively. Each of the indoor units 20*x*1 and 20*y*1, which are included in the indoor units 20, includes the CPU 21, the memory 22, the communication interface 23, and the bus 24, and also has the building ID storage area 22*a*, the device ID storage area 22*b*, and the installation information storing storage area 22*c*, which respectively store a transmitted building ID, device ID, and installation information, and the installation program 22*d*. The connection to the server 30 via the Wi-Fi access points 70C and 70D and the Wi-Fi units 80C and 80D is performed in a way similar to that for the connection to the server 30 via the Wi-Fi access points 70A and 70B and the Wi-Fi units 80A and 80B.

The server 30 performs setting of the selected indoor unit 20*x*1 so as to transmit predetermined operation information designated in advance from within first operation information indicating the operation of the indoor unit 20*x*1 to the server 30 (step ST22). Also, the server 30 performs setting of the selected indoor unit 20*y*1 so as to transmit predetermined operation information designated in advance from within second operation information indicating the operation of the indoor unit 20*y*1 to the server 30 (step ST22). The first operation information and the second operation information include, for example, information indicating on/off of a piece of equipment (information indicating an accumulated operation time), information indicating a detected indoor temperature, information indicating a detected indoor humidity, and the number of revolutions made by an indoor fan (not illustrated). The indoor units 20*x*1 and 20*y*1 are each configured to also transmit a device ID together when transmitting the predetermined operation information. For example, assuming that the building ID of the building 116 is represented by α21, the building ID of the building 117 is represented by α31, the device ID of the indoor unit 20*x*1 is represented by β21, and the device ID of the indoor unit 20*y*1 is represented by β31, the server 30 collects all the received data assigned the device IDs β21 and β31. Thus, the server 30 has a data collection program 32*f* for collecting data assigned a designated device ID from within received data. The server 30 performs setting of the data collection program 32*f* so that data of the indoor units 20*x*1 and 20*y*1 can be collected by using the data collection program 32*f* (step ST23). With the setting described above using the data collection program 32f, the server 30 can also collect data concerning the indoor units 20x1 and 20y1, which is sent from the tablet terminal 90. For example, when data describing the accumulated operation time taken to repair a printed circuit board (not illustrated) of the indoor unit 20x1 and the content is transmitted together with the device ID β21, the server 30 can collect the data.

After installation, the indoor units 20x1 and 10y1 and the tablet terminal 90 connect to the server 30 by using the server connection information stored in the server connection information storage areas 22e and 92c, and transmit data to the server 30 (step ST24). Then, the server 30 collects the data sent from the indoor units 20x1 and 10y1 and the tablet terminal 90 by using the data collection program 32f, and stores the data in the memory 32 (step ST25).

Then, the server 30 creates the research database 38 by using the data of the indoor units 20x1 and 20y1, which is stored in the memory 32, in accordance with a research database creation program 32g, and stores the research database 38 in the database storage area 32c (step ST26). The creation of the research database 38 is performed by, for example, writing data to a column corresponding to the type of the data in a record indicated by each device ID. For example, the data of the accumulated operation time, which is sent from the indoor unit 20x1, is written to accumulated operation time column CL41 in data column CL4 for record No. 1021 to which the device ID β21 is written. For example, the data of repair of the indoor unit 20x1, which is sent from the tablet terminal 90, is written to repair column CL42 for record No. 1021 to which the device ID β21 is written. By referring to the research database 38, a researcher and developer may find that printed circuit boards (P boards) of the indoor units 20 transported by ship are often repaired. Finding such a tendency may lead to development to improve airtightness of packages for the indoor units 20 that are transported by ship. In this way, advantages are found for research and development regarding pieces of equipment installed in remote places, like Japan and New Zealand, such as conducting and/or preparing for research and development without requiring a researcher and developer to visit the sites.

The transmission of data (step ST24), the collection of data (step ST25), and the creation of the research database 38 (step ST26) are repeated (No in step ST27) until sufficient data is obtained. If sufficient data has been obtained (Yes in step ST27), the transmission of data and the collection of data are finished (step ST28).

(2-7) Determination of Operation Status of Equipment Device Associated with Installation Information The operation status of a piece of equipment associated with installation information can be determined by using a technique similar to that for the construction of the research database 38 described above. For example, data such as the number of revolutions made by an indoor fan (not illustrated) is collected from indoor units 20z1 and 20z2, which are installed in the same room in the same building 118. If the indoor unit 20z1 is installed in a perimeter zone and the indoor unit 20z2 is installed in an interior zone, the operation statuses of the indoor units 20z1 and 20z2 associated with the third installation information indicating the attribute of the installation areas can be determined by using the installation database 36. Since a larger load is imposed on the indoor unit 20z1, which is installed in a perimeter zone, than on the indoor unit 20z2, which is installed in an interior zone, the indoor unit 20z1 can be more likely to malfunction. Such an assumption can be verified using the installation database 36. Thus, the installation database 36 can be used not only to install the pieces of equipment but also to determine the operation statuses of the pieces of equipment after installation.

(2-8) Application to Model Base Development

When products are tested by using simulation, for example, obtaining operation data of the indoor units 20z1 and 20z2, which are actually installed in the building 118, the heat load, and so on facilitates recreation of the environment by simulation. A model of a newly developed indoor unit is placed in the prepared environment in the simulation to conduct a simulation of the newly developed indoor unit, thereby improving the accuracy of simulation results of the capability of the newly developed indoor unit, the degree of air conditioning in a room space, and the energy consumption of the newly developed indoor unit.

(2-9) Change of Data in Installation Database 36

The installation database creation program 32d in the server 30 has embedded therein a function of changing the constructed installation database 36. For example, the tablet terminal 90 is used to access the server 30. Then, a device ID is transmitted from the tablet terminal 90 to the server 30 by using the input device 97, and a record of an indoor unit 20b whose installation information needs to be changed is displayed on the display screen 95. Then, the column corresponding to the installation information to be changed is designated by using the input device 97 of the tablet terminal 90, and the content of the column is renewed. Thereafter, the tablet terminal 90 is used to overwrite the installation database 36 with the record changed in the way described above in accordance with the installation database creation program 32d. Accordingly, the equipment installation support system 1 can be configured such that the server 30 can construct the installation database 36 before the shipment of the indoor units 20b and can change the installation information after the construction of the installation database 36.

(3) Features (3-1)

In the equipment installation support system 1, when the building 112 illustrated in FIG. 12 is a specific building, the indoor units 20b are specific pieces of equipment. Each of the indoor units 20b includes the memory 22, which is a specific recording tool. The memory 22 has recorded thereon a device ID, which is second identification information, at the time of shipment from the factory 101. The timing of recording the device IDs is not limited to the time of shipment from the factory 101, and may be time before the installation of the indoor units 20b is started. In the first embodiment described above, a case is taken as an example where the memory 22 stores a building ID, which is first identification information, together with a device ID, which is second identification information. However, only a device ID may be stored. Since the equipment installation support system 1 has the configuration described above, installation tasks, such as checking the setting positions of the indoor units 20b in the building 112, checking the directions after installation, installing the indoor units 20b in accordance with the attributes of the installation areas, and installing the indoor units 20b in accordance with the uses of the room spaces, can be performed by, for example, accessing the server 30 in a period from the manufacturing of the indoor units 20b to the completion of installation of the indoor units 20b, while utilizing the installation database 36, which is a first database, by using the device IDs. This can reduce the number of man-hours required until the installation of the indoor units 20b.

When the memories 22, 72, and 82 have stored therein building IDs and device IDs, for example, installation tasks can be performed by accessing the server 30 before the completion of installation of the indoor units 20b in the building 112, while utilizing the installation information stored in the installation information storage areas 22c, 72c, and 82c of the memories 22, 72, and 82 from the installation database 36 by using the building ID and the device ID. The installation database 36 is an example of a first database. Specifically, the indoor units 20b and the Wi-Fi units 80A and 80B can automatically establish connection of the Wi-Fi access points 70A and 70B by using the SSIDs stored in the installation information storage areas 22c, 72c, and 82c in accordance with the installation programs 22d, 72d, and 82d. As a result, the number of man-hours required until the installation of the plurality of indoor units 20b, the Wi-Fi access points 70A and 70B, and the Wi-Fi units 80A and 80B is reduced.

(3-2)

When the building 112 illustrated in FIG. 12 is a specific building, here, the Wi-Fi access points 70A and 70B are specific wireless communication equipment, and the communication interface 83 is a communication unit of a specific piece of equipment, the Wi-Fi units 80A and 80B are specific pieces of equipment, the memory 82 is a specific storage device, and an SSID is wireless identification information. That is, the Wi-Fi units 80A and 80B, each including the communication interface 83, access the Wi-Fi access points 70A and 70B (examples of a wireless LAN access point). The memory 82 assigned to each of the Wi-Fi units 80A and 80B has an SSID stored therein. Further, the corresponding one of the Wi-Fi access points 70A and 70B has also the same SSID stored therein.

With the configuration described above, the indoor units 20b, which are specific pieces of equipment, when installed, are capable of automatically establishing connection to the Wi-Fi access points 70A and 70B by the Wi-Fi units 80A and 80B reading SSIDs. In the embodiment described above, for example, each of the indoor units 20b in the n-th floor instructs the Wi-Fi unit 80A connected thereto to establish connection with a wireless LAN access point. Upon receipt of the instruction, the Wi-Fi unit 80A activates the installation program 82d in the memory 82 to search for one of the Wi-Fi access points 70A and 70B having an SSID and a password that match those in the installation information stored in the installation information storage area 82c. Consequently, man-hours for establishing connection between the indoor units 20b, the Wi-Fi units 80A and 80B, and the Wi-Fi access points 70A and 70B can be eliminated.

(3-3)

The memories 72 of the Wi-Fi access points 70A and 70B, which are specific wireless communication equipment, and the memories 82 of the Wi-Fi units 80A and 80B, which are specific storage devices, have stored therein passwords for authenticating permission of connection. Thus, without passwords, access to the Wi-Fi access points 70A and 70B and the Wi-Fi units 80A and 80B is limited. As a result, security is easily maintained during installation, tasks for safety for an installation worker can be reduced, and the load of equipment installation can be reduced.

(3-4)

The server 30 is configured to automatically generate an SSID, which is wireless identification information, and a password by using a hash function or the like. Accordingly, an SSID and a password are automatically generated, which can save the labor of, for example, an installation worker to register an SSID and a password.

(3-5)

The Wi-Fi access points 70A and 70B, which are specific wireless communication equipment, automatically connect to the server 30 by using server connection information when power is turned on. Thus, the Wi-Fi units 80A and 80B and the indoor units 20b can connect to the server 30 via the Wi-Fi access points 70A and 70B. As a result, an environment in which installation tasks can be performed with utilization of the installation database 36 in the server 30 can be easily constructed at the site.

(3-6)

Since the memories 82 of the Wi-Fi units 80A and 80B and the memories 22 of the indoor units 20b have a plurality of SSIDs stored therein, when a plurality of Wi-Fi access points 70A and 70B are installed in the building 112, the Wi-Fi units 80A and 80B can be allowed to automatically select the Wi-Fi access points 70A and 70B to be connected thereto in the building 112 without determination of a connection relationship before shipment, the connection relationship indicating to which of the Wi-Fi access points 70A and 70B to connect each of the Wi-Fi units 80A and 80B. As a result, with the use of the equipment installation support system 1 having the configuration described above, man-hours required for installation of pieces of equipment can be eliminated, compared to the case where the connections of the Wi-Fi units 80A and 80B and the Wi-Fi access points 70A and 70B are confirmed by an installation worker one by one.

(3-7)

The Wi-Fi access points 70 and the Wi-Fi units 80 are pieces of equipment and are a plurality of pieces of communication equipment that are intended to be installed in the buildings 116 and 117. The building 116 is a first specific building, and the building 117 is a second specific building. In this case, the Wi-Fi access point 70C and the Wi-Fi unit 80C, which are installed in the building 116, are first specific pieces of communication equipment that are intended to be installed in the first specific building. The Wi-Fi access point 70D and the Wi-Fi unit 80D, which are installed in the building 117, are second specific pieces of communication equipment that are intended to be installed in the second specific building. The indoor unit 20x1 is a first specific piece of equipment that is installed in the first specific building, and the indoor unit 20y1 is a second specific piece of equipment that is installed in the second specific building. For example, in the first embodiment, the server 30 is configured to be capable of constructing the research database 38, which is a second database, in such a manner that the accumulated operation time corresponding to a predetermined operation information in first operation information indicating the operation of the indoor unit 20x1 when the indoor unit 20x1 adjusts the room environment of the building 116 is associated with installation information, and the accumulated operation time corresponding to a predetermined operation information in second operation information indicating the operation of the indoor unit 20y1 when the indoor unit 20y1 adjusts the room environment of the building 117 is associated with installation information. Accordingly, the server 30 performs setting so as to obtain an accumulated operation time, which is predetermined operation information designated in advance, by using the Wi-Fi access points 70C and 70D and the Wi-Fi units 80C and 80D. As described above, in the equipment installation support system 1, the server 30 can construct the research database 38 by, for example, designating in advance predetermined operation information suitable for research or development, which can eliminate, for example, a task at the site for constructing the research database 38, such as investigating installation information at the site or setting a specific piece of equipment (the indoor units 20x1 and 20y1) at the site for research or investigation.

(3-8)

In the equipment installation support system 1, the server 30 is configured to construct the installation database 36 before the shipment of the indoor units 20b, which are specific pieces of equipment, and configured to be capable of changing installation information after the construction of the installation database 36. In the equipment installation support system 1, installation information can be changed after the construction of the installation database 36. Thus, even if a mismatch occurs between a situation concerning installation and installation information after the construction of the installation database 36, such as if the building 116 is renovated or if an setting position in the building 116 is changed, the installation information is changed, thereby being able to prevent a reduction in the effectiveness of the installation database 36.

For example, in a case where a plurality of indoor units 20b of the same type are present in the same building 116 and in a case where spare indoor units 20b are transported together, installation information of the plurality of indoor units 20b may be rewritten and the installation locations of the plurality of indoor units 20b may be exchanged.

(4) Modifications (4-1) Modification 1A

In the first embodiment described above, a building ID assigned to one building has been described as an example of first identification information. However, the first identification information is not limited to a building ID assigned to one building, and may be, for example, a location ID assigned to each floor of a building. For example, the server 30 may set a location ID as first identification information identifying the fifth floor of the building 112. Alternatively, a first identification information may be set for an aggregate of multiple buildings. For example, a single piece of first identification information may be set for a museum having a plurality of buildings.

(4-2) Modification 1B

In the first embodiment described above, a case has been described where separate device IDs are set for each of the indoor units 20b and the Wi-Fi unit 80A or the Wi-Fi unit 80B connected thereto. However, a single piece of second identification information may be set for an aggregate of such multiple devices (for example, a connection of each of the indoor units 20b and a corresponding one of the Wi-Fi units 80A).

(4-3) Modification 1C

In the first embodiment described above, installation tasks have been described in the context of tasks for establishing connection between each of the Wi-Fi access points 70A and 70B, which are installed in the same building 112, and the Wi-Fi unit 80A or the Wi-Fi unit 80B to be connected to each of the indoor units 20b. However, the tasks for establishing connection are not limited to the wireless LAN connection described in the first embodiment.

For example, a smartphone 200 illustrated in FIG. 12 has installed therein an application for exercising the remote control function of the indoor units 20b. In this case, also when connection is established between the smartphone 200 and a short-range wireless communication unit connected to the indoor units 20b via, for example, Bluetooth (registered trademark) or Zigbee (registered trademark), the connection can be automatically established at the site in a way similar to that for the establishment of the wireless LAN connection. Also in this case, recording first identification information and second identification information at the time of shipment from the factory can reduce the number of man-hours for installation tasks. For example, in the case of Bluetooth (registered trademark), a passcode (PIN code) is registered, at the stage of shipment from the factory, in installation information in the installation database 36 of a short-range wireless communication unit that is connected to the indoor units 20b. For example, in the case of Zigbee (registered trademark), a PAN ID is registered, at the stage of shipment from the factory, in installation information in the installation database 36 of a short-range wireless communication unit that is connected to the indoor units 20b.

In addition, a device other than the smartphone 200, for example, an external sensor 210 that detects a temperature, a humidity, carbon dioxide, or the like may also be provided with a short-range wireless communication function. This can reduce the number of man-hours for tasks for establishing connection in a manner similar to that for the smartphone 200 described above.

(4-4) Modification 1D

In the first embodiment described above, first identification information and second identification information are separately handled. However, in the present disclosure, first identification information and second identification information need not be separately handled. For example, if first identification information is 16-bit data and second identification information is 16-bit data, 32-bit data, which is obtained by adding together the pieces of data, may be handled as a single piece of data including both the first identification information and the second identification information.

(4-5) Modification 1F

In the first embodiment described above, shipment has been described in the context of shipment from a factory. However, shipment is not limited to direct shipment from a factory. For example, when items transported from a factory are collected at an intermediate distribution point and then shipped from the distribution point, the time of shipment described in the first embodiment can be regarded as the time of shipment from the distribution point.

(4-6) Modification 1G

In the first embodiment described above, a case has been described where a specific piece of equipment having a configuration to adjust a room environment is an indoor unit. However, the specific piece of equipment may be a device other than an indoor unit. The specific piece of equipment may be, for example, an air conditioner including an indoor unit and an outdoor unit, a floor heating device having a configuration to adjust a floor temperature in a room environment, a hot water supply apparatus having a configuration to adjust the temperature of hot water to be supplied to a kitchenette in a room environment, an air cleaner having a configuration to adjust the proportion of dust in the air in a room space within a room environment, or a ventilation device having a configuration to adjust air ventilation in a room space within a room environment.

(4-7) Modification 1H

In the first embodiment described above, a case has been described where the Wi-Fi units 80A, 80B, 80C, and 80D are externally attached to the indoor units 20b. However, a specific piece of equipment, such as the indoor units 20, may be configured to have a built-in function of the Wi-Fi units 80A to 80D. That is, a specific piece of equipment itself may have a function of communicating with a Wi-Fi access point without being connected to the Wi-Fi units 80A to 80D.

(4-8) Modification 1I

In the first embodiment described above, a case has been described where the equipment installation support system 1 is configured to allow the indoor units 20x1 and 20y1 and the server 30 to perform transmission and reception by using the Wi-Fi access points 70C and 70D and the Wi-Fi units 80C and 80D, which are pieces of wireless communication equipment, in order to construct the research database 38. However, the equipment installation support system may be configured to allow the indoor units 20x1 and 20y1 and the server 30 to perform transmission and reception in a wired manner.

(4-9) Modification 1J

In the first embodiment described above, an accumulated operation time is described as an example of predetermined operation information. However, the predetermined operation information is not limited to an accumulated operation time. Examples of the predetermined operation information include information indicating an indoor temperature detected by an indoor unit in an air conditioner, information indicating a target temperature of a room space, which is set in an indoor unit, information indicating an indoor humidity detected by an indoor unit, information indicating the number of revolutions made (the volume of air delivered) by an indoor fan, information indicating the operation of a flap that adjusts the direction of airflow blown out from an indoor unit, information indicating the temperature of refrigerant (for example, the temperature of an indoor heat exchanger) in an indoor unit, information indicating the power consumption of an indoor unit, and information concerning the maintenance of an indoor unit. In the case of an outdoor unit of an air conditioner, examples of the predetermined operation information include information indicating an outdoor temperature detected by the outdoor unit, information indicating an outdoor humidity detected by the outdoor unit, information indicating the number of revolutions made by an outdoor fan, information indicating the operation frequency of a compressor disposed in the outdoor unit to compress refrigerant, information indicating the temperature of refrigerant in the outdoor unit, information indicating the power consumption of the outdoor unit, and information concerning the maintenance of the outdoor unit. In the case of a floor heating device, examples of the predetermined operation information include information indicating a target temperature of a floor temperature, which is set in the floor heating device, information indicating a floor temperature detected by the floor heating device, information indicating the accumulated operation time of the floor heating device, information indicating the power consumption of the floor heating device, and information concerning the maintenance of the floor heating device. In the case of a hot water supply apparatus, examples of the predetermined operation information include information indicating a target temperature of hot water to be supplied, which is set in the hot water supply apparatus, information indicating the temperature of hot water to be supplied, which is detected by the hot water supply apparatus, information indicating the amount of hot water to be supplied by the hot water supply apparatus, information indicating the power consumption of the hot water supply apparatus, information indicating the accumulated operation time of the hot water supply apparatus, and information concerning the maintenance of the hot water supply apparatus. In the case of an air cleaner, examples of the predetermined operation information include information indicating the number of revolutions made by a fan, information indicating the accumulated operation time of the air cleaner, information concerning the power consumption of the air cleaner, and information concerning maintenance such as replacement of filters. In the case of a ventilation device, examples of the predetermined operation information include information indicating the number of revolutions made by a fan, information concerning switching between ventilation modes, information indicating the accumulated operation time of the ventilation device, information concerning the power consumption of the ventilation device, and information concerning maintenance such as replacement of filters.

Second Embodiment (5) Overall Configuration

A second embodiment will be described, also taking the indoor units 20 of an air conditioner as an example, as in the first embodiment. An equipment installation support system 1 according to the second embodiment includes a plurality of indoor units 20 illustrated in FIG. 13 as a plurality of devices. The equipment installation support system 1 further includes a server 30. The equipment installation support system 1 further includes, as a recording tool, a sticker 40 having printed thereon a two-dimensional code such as a QR code (registered trademark).

(5-1) Construction of Database

For example, the server 30 sets building IDs $\alpha 1$, $\alpha 2$, and $\alpha 3$ for the plurality of buildings 111 to 113 described above through the operations of steps ST1 to ST8 illustrated in FIG. 5. For example, the server 30 sets device IDs $\beta 1$ to $\beta 29$, $\beta 30$ to $\alpha 60$, and $\beta 61$ to $\beta 96$ for the plurality of indoor units 20 described above, and constructs an installation database 36.

(5-2) Recording of Data Using Installation Database

Figure 13:
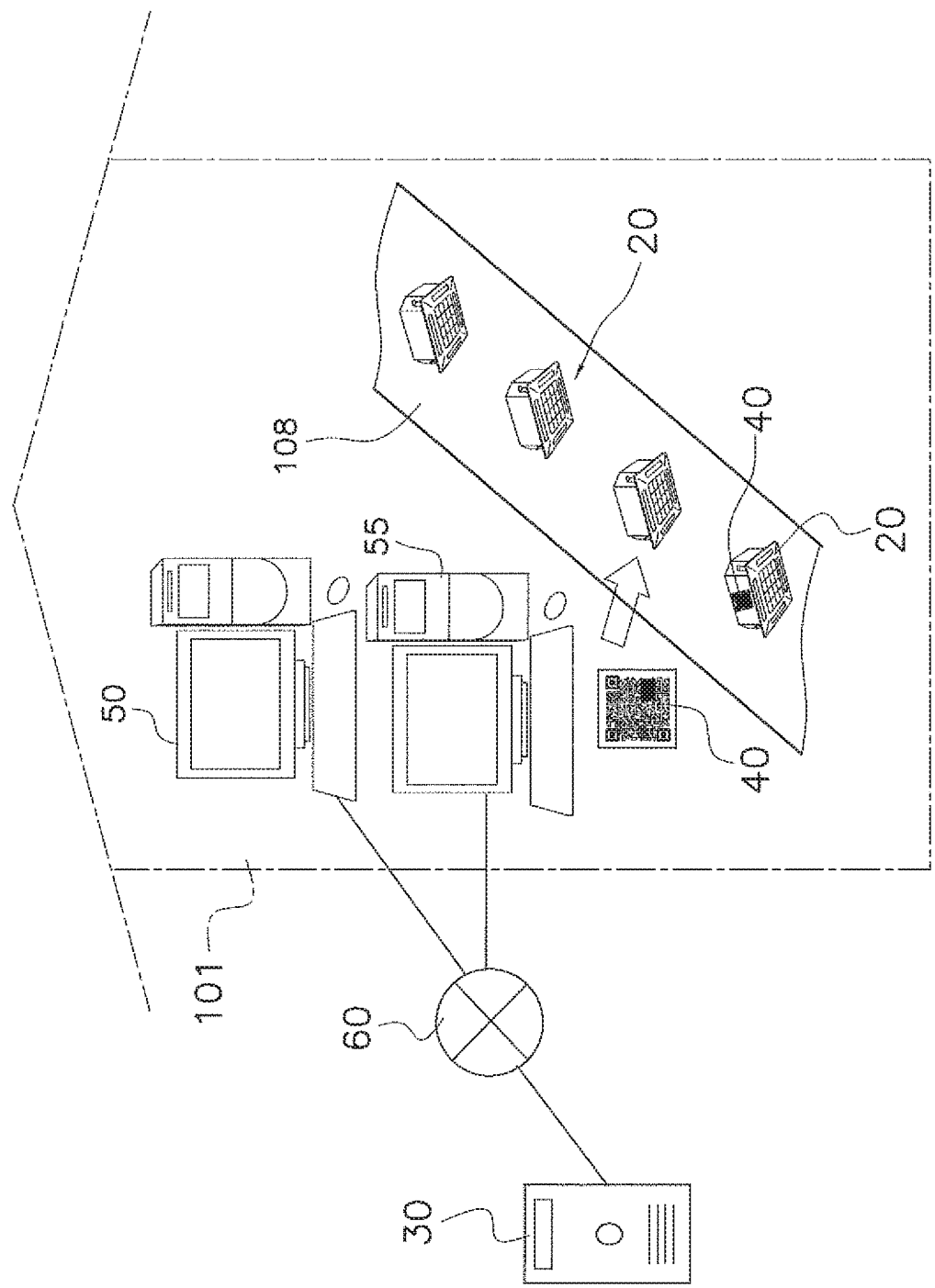
FIG. 13 is a conceptual diagram for describing construction of an installation database and writing of data in a factory according to a second embodiment.

An output device 55 illustrated in FIG. 13 is arranged in a factory 101. In the following description of the second embodiment, the building 112 is assumed to be a specific building, and indoor units 20b are assumed to be specific pieces of equipment. When the installation database 36 for the indoor units 20b, which are specific pieces of equipment, is constructed, the server 30 transmits the building ID of the building 112 and the device IDs of the indoor units 20b to the output device 55. The output device 55 is provided with, for example, a printer and outputs the sticker 40 having printed thereon a QR code indicating the building ID and each of the device IDs. On a production line 108 in the factory 101, the sticker 40 is applied to each of the indoor units 20b. It is sufficient to apply the sticker 40 before shipment. Thus, for example, the sticker 40 may be applied to each of the indoor units 20b while the indoor units 20b are kept in the factory after manufacturing. The number of stickers 40 to be applied to each of the indoor units 20b is not limited to one, and a plurality of stickers 40 may be applied to each of the indoor units 20b. Furthermore, the location where the sticker 40 is applied is not also limited to the indoor units 20b, and may be applied to, for example, a packaging material that packs each of the indoor units 20b. The application of the sticker 40 corresponds to the recording of data on the indoor units 20b, which are specific pieces of equipment, by using the installation database 36.

While a case is described here where a single sticker 40 has printed thereon a QR code indicating a building ID and a device ID, a QR code indicating a building ID and a device ID may be separately printed on two stickers. In this case, the timing of applying the sticker 40 with the QR code indicating the building ID printed thereon may be different from the timing of applying the sticker 40 with the QR code indicating the device ID printed thereon. The QR code on the sticker 40 may indicate not only a building ID and a device ID but also installation information.

(5-3) Installation of Indoor Units 20b

The equipment installation support system 1 according to the second embodiment includes a tablet terminal 90 illustrated in FIG. 14 as a smart device. The tablet terminal 90 includes a CPU 91, a memory 92, a communication interface 93, a display screen 95, a reading device 96, and a bus 34 that connects the CPU 91, the memory 92, the communication interface 93, the display screen 95, and the reading device 96 to one another. Data transmitted and received between the CPU 91, the memory 92, the communication interface 93, the display screen 95, and the reading device 96 is delivered through the bus 94. The term smart device, as used here, refers to a portable multi-function terminal capable of connecting to the Internet and capable of utilizing various software applications. Examples of the smart device include the tablet terminal 90 described above and smartphones.

An installation worker activates the tablet terminal 90, standing inside or near the building 112. The CPU 91 of the tablet terminal 90 automatically connects to the server 30 in accordance with an installation program 92b stored in the memory 92 by using server connection information stored in a server connection information storage area 92c. The connection to the server 30 is performed via the public line 60 by using the communication interface 93.

For example, the installation worker inputs information on the building 112 to the tablet terminal 90. For example, the installation worker directs the tablet terminal 90 toward the sticker 40 to allow the reading device 96 to read the building ID presented on the sticker 40. When the building ID of the building 112 is input, the CPU 91 obtains information related to the building ID (part of the installation database 36, except for information related to the other building IDs) from the installation database 36 in the server 30 and writes the information to a database storage area 92a.

The CPU 91 extracts necessary installation information from the installation database 36 stored in the database storage area 92a in accordance with the installation program 92b. For example, the CPU 91 extracts an installation drawing, a mounting position, device information, and so on and displays them on the display screen 95. The installation worker installs the plurality of indoor units 20b by using the installation information displayed on the display screen 95.

(6) Specific Example of Installation Tasks

A specific example of installation tasks performed by the equipment installation support system 1 according to the second embodiment will be described with reference to FIG. 15 to FIG. 22. As illustrated in FIG. 15, when the tablet terminal 90 is activated, a login image is displayed on the display screen 95 in accordance with the installation program 92b. When the installation worker inputs a correct login password to the tablet terminal 90, communication becomes possible between the tablet terminal 90 and the server 30.

When the installation worker inputs information on the building 112, part of the installation database 36 is downloaded to the tablet terminal 90. The input of the information on the building 112 can be performed by the reading device 96 reading the building ID on the sticker 40 or by using a touch panel of the tablet terminal 90, for example. Alternatively, the tablet terminal 90 may be provided with a position detection device such as a GPS device and may be configured such that the CPU 91 automatically obtains the information on the building 112. The tablet terminal 90 may be configured to save the installation worker's labor to input the information on the building 112.

When writing the installation database 36 to the database storage area 92a, the CPU 91 displays installation information in the installation database 36 on the display screen 95. For example, as illustrated in FIG. 16, the CPU 91 displays a list of devices to be installed by QR code on the display screen 95 together with the number of devices. This operation may not be performed on the same day as the day of the tasks, and may be performed on the previous day, for example.

Figure 17:
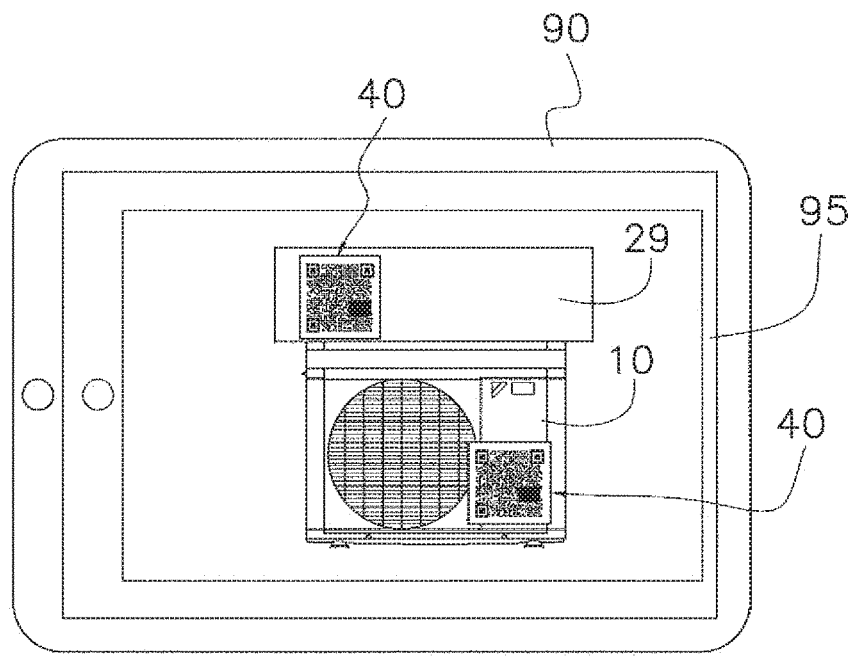
FIG. 17 is a plan view illustrating an example display on the tablet terminal, which has captured an image of devices to be installed.

FIG. 17 illustrates an image of devices to be installed, which is captured by the reading device 96. In FIG. 17, a captured image of an outdoor unit 10 and a package 29 of an indoor unit 20b is illustrated. The outdoor unit 10 has a casing on which the sticker 40 is applied, whereas the sticker 40 is applied to the package 29 of the indoor unit 20b. In this case, for example, the CPU 91 highlights any one and then transitions to the display of installation information. When the imaging of all the target devices illustrated in FIG. 16 is completed, the CPU 91 of the tablet terminal 90 determines a procedure for transportation of the devices in accordance with the installation program 92b. For example, the CPU 91 displays the package 29 to be transported on the display screen 95 of the tablet terminal 90 to promote transportation of the device.

Figure 18:
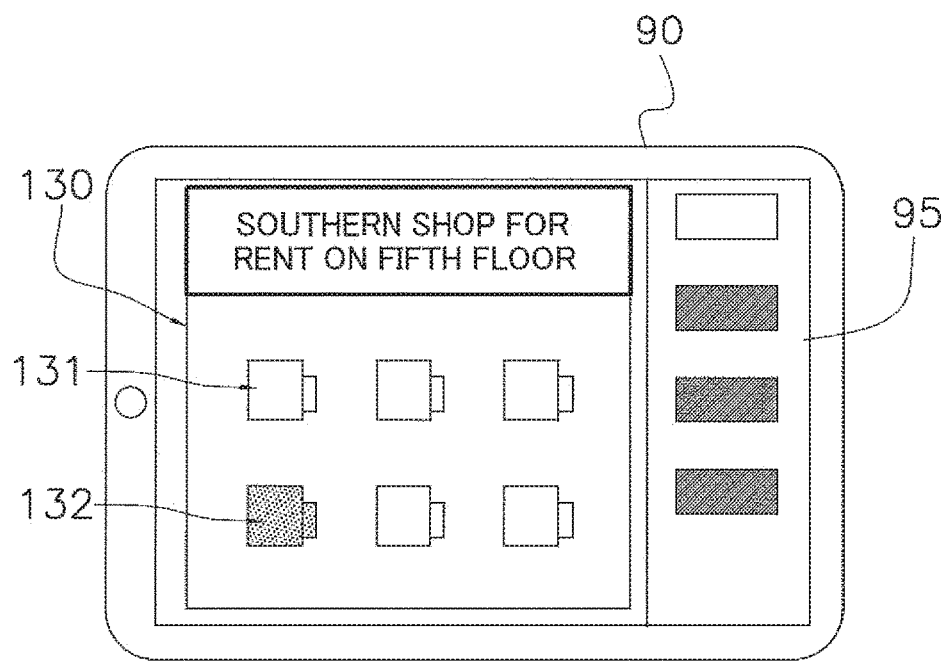
FIG. 18 is a plan view illustrating an example display on the tablet terminal for the installation location of an indoor unit.

When the device to be transported next is read by the reading device 96, the CPU 91 displays an installation location on the display screen 95. FIG. 18 illustrates an installation location 130 of the indoor unit 20b packed in the package 29. The installation location 130 is a "southern shop for rent on the fifth floor". The display screen 95 shows a schematic drawing of the installation location 130. The drawing of the southern shop for rent on the fifth floor in FIG. 18 depicts six shapes 131 of indoor units, which represent the arrangement positions of six indoor units 20b within the shop for rent. Among the six shapes 131, a hatched shape 132 represents the arrangement position of the indoor unit 20b in the package 29 illustrated in FIG. 17.

Figure 19:
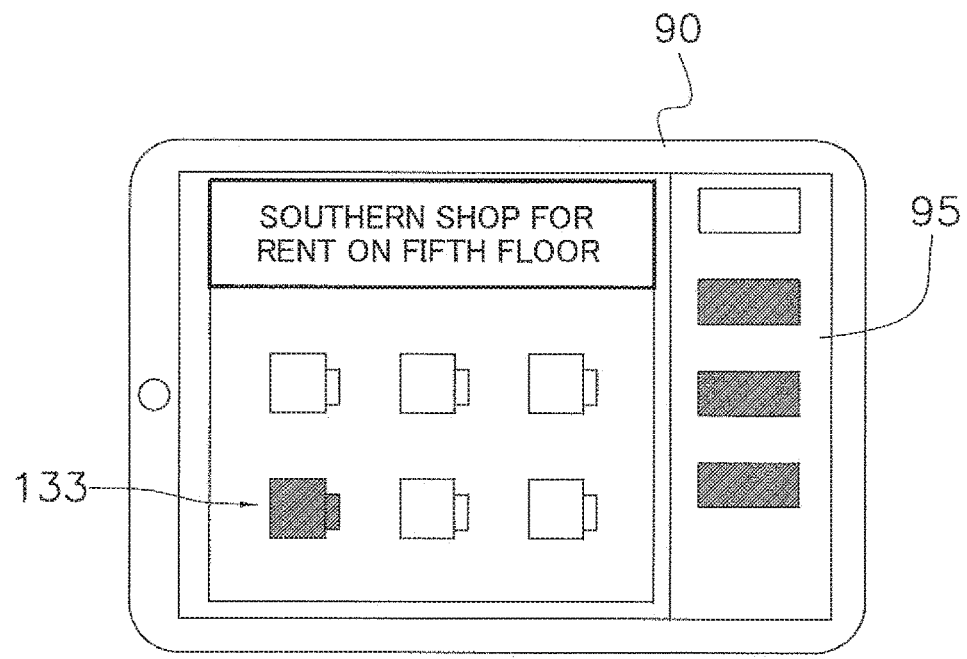
FIG. 19 is a plan view illustrating an example display on the tablet terminal after the indoor unit is installed.

After transporting the package 29 to the target floor, the installation worker checks the arrangement positions illustrated in FIG. 18, moves the package 29 to the arrangement position, and then taps the shape 132. When the shape 132 is tapped, the CPU 91 changes the color of the shape 132 in accordance with the installation program 92b. FIG. 19 illustrates a shape 133 whose color has been changed.

Figure 20:
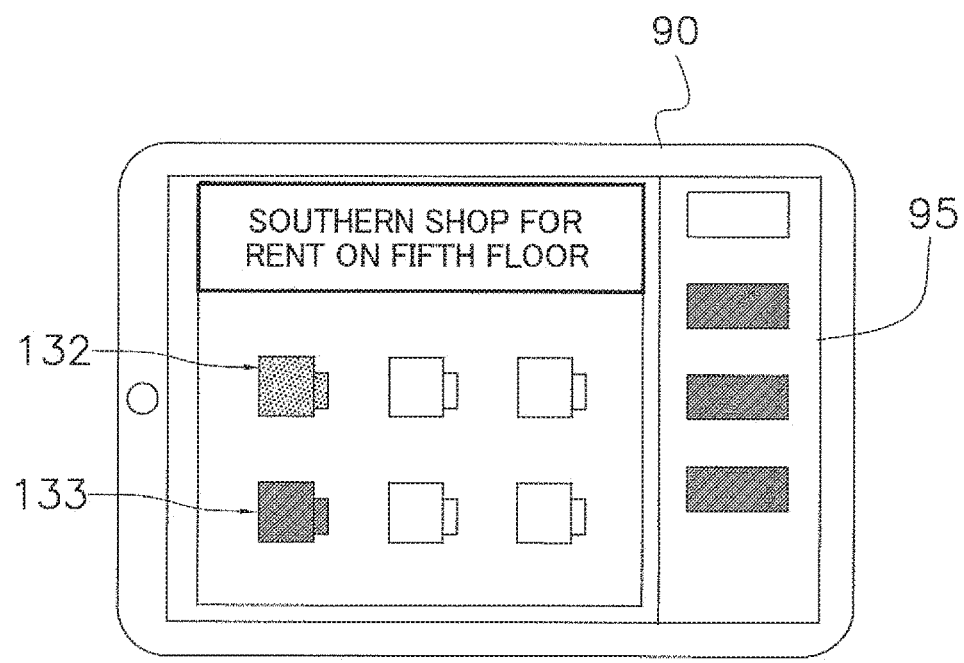
FIG. 20 is a plan view illustrating an example display on the tablet terminal, which presents the installation location of the second indoor unit.
Figure 21:
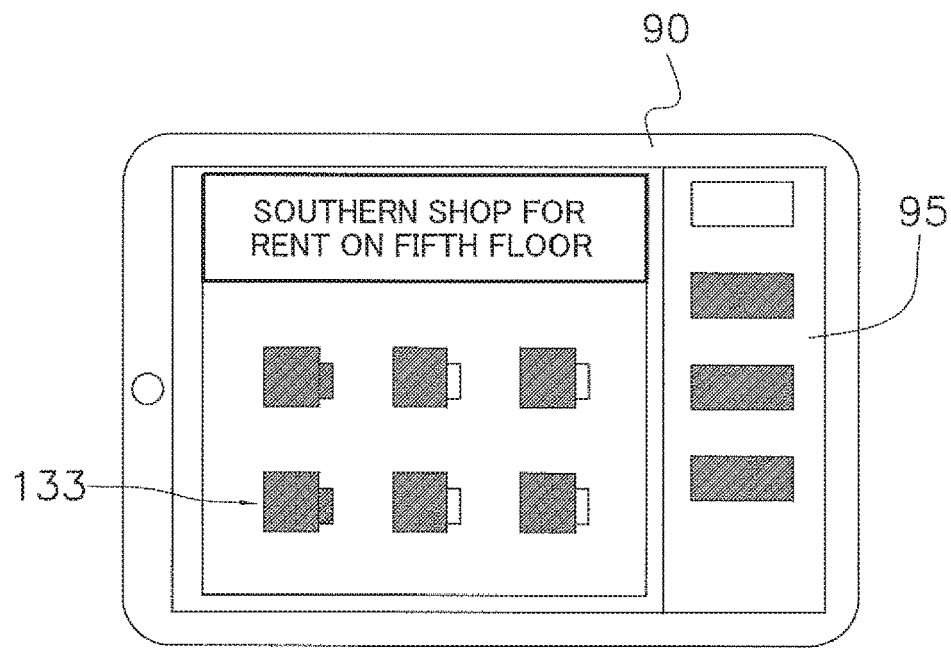
FIG. 21 is a plan view illustrating an example display on the tablet terminal after six indoor units are installed.

When the QR code on the next package 29 is read by the reading device 96 of the tablet terminal 90 in a similar way, as illustrated in FIG. 20, the arrangement position of the indoor unit 20b in the next package 29 is displayed as the shape 132. The operation described above is repeated six times, thereby, as illustrated in FIG. 21, displaying six shapes 133 on the display screen 95.

Figure 22:
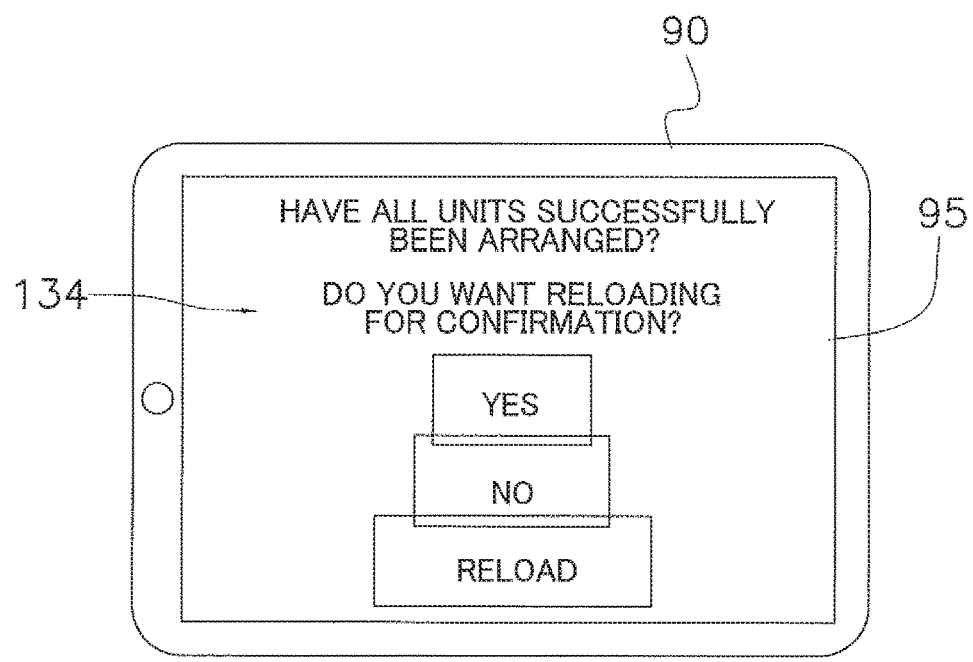
FIG. 22 is a plan view illustrating an example display on the tablet terminal during confirmation of a task.

Upon recognition of the completion of the arrangement of the intended number of indoor units 20b in accordance with the installation program 92b, for example, as illustrated in FIG. 22, the CPU 91 displays a message 134 on the display screen 95 to prompt the installation worker to make a confirmation. The tasks described above using the tablet terminal 90 are performed for all the devices stored in the database storage area 92a for the building 112.

As described above, a plan for transportation is created and an instruction for transportation is provided by using the tablet terminal 90. This eliminates part of the confirmation tasks and setting tasks of an installation worker, which are performed conventionally, and reduces the number of man-hours for installation performed by the installation worker.

(7) Features (7-1)

In the equipment installation support system 1, when the building 112 is a specific building, the sticker 40, which is a specific recording tool assigned to each of the indoor units 20b, which are specific pieces of equipment, at the time of shipment from the factory 101, has recorded thereon a building ID and a device ID, which are first identification information and second identification information, at the time of shipment from the factory 101. Since the equipment installation support system 1 has the configuration described above, installation tasks can be performed by, for example, accessing the server 30 in a period from manufacturing to shipment, while utilizing installation information by downloading part of the installation database 36 by using the building ID and the device ID. Specifically, the installation database 36 stored in the database storage area 92a of the tablet terminal 90 can be used to display installation information for use in the installation tasks on the display screen 95 of the tablet terminal 90 in accordance with the installation program 92b. As a result, the number of man-hours required until the installation of the plurality of indoor units 20b is reduced.

(7-2)

At the time of shipment, a building ID has already been recorded on a plurality of stickers 40. Thus, after the shipment, the building ID can be obtained from the stickers 40 to check the building 112 in which the indoor units 20b are to be installed during delivery and/or after delivery. As a result, the confirmation task and the like for the delivery of the indoor units 20b can be simplified, together with a reduction in wrong deliveries. This can reduce the number of man-hours for tasks performed until the installation of the indoor units 20b.

(7-3)

The tablet terminal 90, which serves as an inquiry device, can read device IDs from the stickers 40 and inquire of the installation database 36. Thus, installation information of the indoor units 20b can be obtained at the site by using the tablet terminal 90. With the use of the tablet terminal 90, the number of man-hours for a task for obtaining installation information at the site or instructing the operation procedure can be reduced.

(7-4)

The reading device 96 of the tablet terminal 90 can easily read a building ID and device IDs from the stickers 40, which are visual indicators assigned to the indoor units 20b. Thus, by directing the tablet terminal 90 toward each of the stickers 40 on the indoor units 20b, installation information associated with the building ID and the device ID can be promptly obtained. As a result, a task for searching for installation information by using the building ID and device IDs can be eliminated.

(7-5)

The display screen 95 of the tablet terminal 90, which is a smart device, is used to provide the diagrammatic presentation described above for installing the indoor units 20b on the basis of installation information. This allows the installation worker to visually recognize part of information necessary to install the indoor units 20b by using the drawings illustrated in, for example, FIG. 18 to FIG. 21. Confirmation tasks for setting positions and/or the locations where tasks for the indoor units 20b are performed, such as comparing them with the drawing based on the installation information, can be simplified.

(8) Modifications (8-1) Modification 2A

In the second embodiment described above, the sticker 40 having recorded thereon a code image has been described as an example of a recording tool. Instead of the sticker 40, a storage device may be used which provides a building ID and a device ID to a short-range wireless communication unit.

Examples of short-range wireless communication include the FeliCa (registered trademark) communication scheme, ISO/IEC 14443 (MIFARE (registered trademark) communication scheme), and ISO/IEC 18092 (NFC: Near Field Communication). The storage device is, for example, a device that stores data to be used by a CPU, such as a read-only memory. The short-range wireless communication unit includes a CPU. The CPU of the short-range wireless communication unit is configured to read a building ID (an example of first identification information) and a device ID (an example of second identification information) stored in the storage device to perform short-range wireless communication. Examples of the short-range wireless communication unit include an IC card (integrated circuit card).

In a case where a short-range wireless unit of a specific piece of equipment is configured to be capable of transmitting first identification information and second identification information in the storage device, the equipment installation support system 1 includes an inquiry device including a receiving unit that receives first identification information and second identification information transmitted from the short-range wireless communication unit. The inquiry device is, for example, a tablet terminal or a smartphone. The tablet terminal or smartphone includes a communication interface (an example of a receiving unit) that receives a radio wave transmitted from the short-range wireless communication unit of the specific piece of equipment. That is, the communication interface of the tablet terminal or smartphone is capable of receiving a building ID and a device ID from the short-range wireless communication unit of the specific piece of equipment.

For example, an IC card to which a building ID and a device ID are written before shipment from the factory is applied to each of the indoor units 20b instead of the sticker 40 described above. The tablet terminal 90 is capable of receiving the building ID and the device ID from the IC card applied to each of the indoor units 20b by using the communication interface 93 via short-range wireless communication.

In the tablet terminal 90 having the configuration described above, the communication interface 93 can easily obtain a building ID and device ID stored in a specific storage device via the IC card, which is a short-range wireless communication unit. Thus, for example, by moving close to each of the indoor units 20b while carrying the tablet terminal 90, an installation worker is able to promptly obtain installation information associated with first identification information and second identification information through the display screen 95. Accordingly, the task performed by the installation worker to search for installation information by using a building ID and a device ID can be eliminated.

Alternatively, the tablet terminal 90 having the configuration described above may be used to change the installation database 36 before installation, for example, in the middle of transportation. For example, if an initially intended indoor unit is broken or the like due to an accident or the like in the middle of transportation, the accident may be addressed by, for example, registering an alternative indoor unit in the installation database 36, instead of the broken indoor unit, and deleting the broken indoor unit from the installation database 36.

(8-2) Modification 2B

In the second embodiment described above, the sticker 40 having a QR code printed thereon is described as an example of a visual indicator. However, the visual indicator is not limited to a sticker, and, for example, a QR code may be printed directly on a surface of each of the indoor units 20*b*. The visual indicator may be displayed on a liquid crystal display device. Further, the code image recorded on the visual indicator is not limited to a two-dimensional code such as a QR code, and may be, for example, a one-dimension code such as a barcode.

(8-3) Modification 2C

In the second embodiment described above, the tablet terminal 90 has been described as an example of a smart device. However, the smart device is not limited to a tablet terminal, and, for example, a smartphone may be used as a smart device. For example, when the visual indicator is a sticker having a barcode printed thereon, the smart device may be a barcode reader having a function of reading the barcode and a function of connecting to the server 30 via the public line 60.

(8-4) Modification 2D

In the second embodiment described above, a case has not been described where the tablet terminal 90 provides an instruction for installation tasks to each of the indoor units 20*b*. However, the tablet terminal 90 may provide an instruction for installation tasks to each of the indoor units 20*b*. In this case, for example, each of the indoor units 20*b* has the configuration illustrated in FIG. 6. For example, a configuration may be provided in which, after the arrangement confirmation illustrated in FIG. 22, at the stage where the completion of installation of the indoor units 20*b* is confirmed, the tablet terminal 90, which has confirmed the completion of the installation, provides an instruction to conduct a trial run of, for example, an air conditioner including the indoor units 20*b*. Alternatively, an instruction may be transmitted from the tablet terminal 90 to each of the indoor units 20*b* to change the settings of the indoor unit 20*b* so that the default values on shipment from the factory are changed to settings customized for the building 112. In this case, the tablet terminal 90 provides an instruction while making a confirmation by using the building ID and the device IDs. This can simplify the setting tasks and prevent an error in the setting tasks.

While embodiments of the present disclosure have been described, it should be understood that configurations and details can be modified in various ways without departing from the gist and scope of the present disclosure as defined in the claims.

What is claimed is:

1. An equipment installation support system usable to support setting of a plurality of pieces of equipment intended to be installed in a plurality of buildings, comprising:
    a plurality of recording tools, each recording tool being assigned to one of the plurality of pieces of equipment, each recording tool having recorded thereon information concerning the assigned one of the plurality of pieces of equipment, each recording tool including at least one of a memory and a medium; and
    a server configured to manage the plurality of pieces of equipment,
    the plurality of pieces of equipment including a specific piece of equipment that is intended to be installed in a specific building among the plurality of buildings and has a configuration to adjust a room environment of the specific building,
    the plurality of recording tools including a specific recording tool assigned second identification information that is assigned to the specific piece of equipment and identifies the specific piece of equipment from pieces of equipment other than the specific piece of equipment,
    the server being configured to construct a first database in which first identification information identifying the specific building from buildings other than the specific building, the second identification information of the specific piece of equipment intended to be installed in the specific building, and installation information concerning installation in the specific building are associated with one another,
    the installation information including one or more than one of
        first installation information indicating a specific location of the specific piece of equipment in the specific building, and
        second installation information indicating a direction of the specific piece of equipment after installation,
    the plurality of pieces of equipment including a plurality of pieces of wireless communication equipment intended to be installed in the plurality of buildings,
    the plurality of pieces of wireless communication equipment including at least one specific piece of wireless communication equipment intended to be installed in the specific building,
    the specific recording tool includings a specific memory assigned to the specific piece of equipment,
    the specific piece of wireless communication equipment having wireless identification information stored therein as the installation information, the wireless identification information being used to establish connection with the specific piece of wireless communication equipment,
    the specific piece of equipment including a communication interface configured to access the specific piece of wireless communication equipment,
    the specific memory having the wireless identification information stored therein as the installation information, and
    the specific piece of wireless communication equipment including a memory that stores server connection information, the server connection information being usable to connect to the server, and the specific piece of wireless communication equipment being configured to automatically connect to the server by using the server connection information when power is turned on.

2. The equipment installation support system according to claim 1, wherein
    the specific piece of wireless communication equipment has stored therein as the installation information a password usable to authenticate permission of connection thereto, and
    the specific memory has the password stored therein as the installation information.

3. The equipment installation support system according to claim 2, wherein
    the server is configured to automatically generate the wireless identification information and the password.

4. The equipment installation support system according to claim 1, wherein
    the server is configured to construct the first database before shipment of the specific piece of equipment, and the server is configured to be capable of changing the installation information after construction of the first database.

5. The equipment installation support system according to claim 1, wherein
the first identification information is recorded on the specific recording tool in a period before shipment of the specific piece of equipment.

6. The equipment installation support system according to claim 5, further comprising
an inquiry device configured to read the second identification information from the recording tool and inquire of the first database.

7. The equipment installation support system according to claim 6, wherein
the recording tools include a plurality of visual indicators, each visual indicator having the first identification information and the second identification information recorded thereon as a code image,
the specific recording tool includes a specific visual indicator assigned to the specific piece of equipment, and
the inquiry device reads the code image.

8. The equipment installation support system according to claim 6, wherein
the recording tools include a memory having stored therein the first identification information and the second identification information,
the specific recording tool includes a specific memory assigned to the specific piece of equipment,
the specific piece of equipment includes a short-range wireless communication unit that transmits the first identification information and the second identification information, which are stored in the specific memory, via short-range wireless communication, and
the inquiry device includes a communication interface that receives the first identification information and the second identification information transmitted from the short-range wireless communication unit.

9. The equipment installation support system according to claim 6, wherein
the inquiry device includes a smart device capable of accessing the server to refer to the first database, and
the smart device includes a display screen that provides a diagrammatic presentation concerning installation of the specific piece of equipment in the specific building based on the installation information.

10. The equipment installation support system according to claim 2, wherein
the server is configured to construct the first database before shipment of the specific piece of equipment, and the server is configured to be capable of changing the installation information after construction of the first database.

11. The equipment installation support system according to claim 7, wherein
the inquiry device includes a smart device capable of accessing the server to refer to the first database, and
the smart device includes a display screen that provides a diagrammatic presentation concerning installation of the specific piece of equipment in the specific building based on the installation information.

12. The equipment installation support system according to claim 8, wherein
the inquiry device includes a smart device capable of accessing the server to refer to the first database, and
the smart device includes a display screen that provides a diagrammatic presentation concerning installation of the specific piece of equipment in the specific building based on the installation information.

13. An equipment installation support system usable to support setting of a plurality of pieces of equipment intended to be installed in a plurality of buildings, comprising:
a plurality of recording tools, each recording tool being assigned to one of the plurality of pieces of equipment, each recording tool having recorded thereon information concerning the assigned one of the plurality of pieces of equipment, each recording tool including at least one of a memory and a medium; and
a server configured to manage the plurality of pieces of equipment,
the plurality of pieces of equipment including a specific piece of equipment that is intended to be installed in a specific building among the plurality of buildings and has a configuration to adjust a room environment of the specific building,
the plurality of recording tools including a specific recording tool assigned second identification information that is assigned to the specific piece of equipment and identifies the specific piece of equipment from pieces of equipment other than the specific piece of equipment,
the server being configured to construct a first database in which first identification information identifying the specific building from buildings other than the specific building, the second identification information of the specific piece of equipment intended to be installed in the specific building, and installation information concerning installation in the specific building are associated with one another,
the installation information including one or more than one of
first installation information indicating a specific location of the specific piece of equipment in the specific building, and
second installation information indicating a direction of the specific piece of equipment after installation,
the plurality of pieces of equipment including a plurality of pieces of wireless communication equipment intended to be installed in the plurality of buildings,
the plurality of pieces of wireless communication equipment including at least one specific piece of wireless communication equipment intended to be installed in the specific building,
the specific recording tool including a specific memory assigned to the specific piece of equipment,
the specific piece of wireless communication equipment having wireless identification information stored therein as the installation information, the wireless identification information being used to establish connection with the specific piece of wireless communication equipment,
the specific piece of equipment includes a communication interface configured to access the specific piece of wireless communication equipment,
the specific memory has the wireless identification information stored therein as the installation information,
the at least one specific piece of wireless communication equipment including a plurality of specific pieces of wireless communication equipment, and
a plurality of pieces of wireless identification information, each including the wireless identification information in one of the specific piece of wireless communication equipment as the installation information, being written to the specific memory in a period before shipment of the specific piece of equipment or during a task for installing the specific piece of equipment.

14. An equipment installation support system usable to support setting of a plurality of pieces of equipment intended to be installed in a plurality of buildings, comprising:
- a plurality of recording tools, each recording tool being assigned to one of the plurality of pieces of equipment, each recording tool having recorded thereon information concerning the assigned one of the plurality of pieces of equipment, each recording tool including at least one of a memory and a medium; and
- a server configured to manage the plurality of pieces of equipment,
- the plurality of pieces of equipment including a specific piece of equipment that is intended to be installed in a specific building among the plurality of buildings and has a configuration to adjust a room environment of the specific building,
- the plurality of recording tools including a specific recording tool assigned second identification information that is assigned to the specific piece of equipment and identifies the specific piece of equipment from pieces of equipment other than the specific piece of equipment,
- the server being configured to construct a first database in which first identification information identifying the specific building from buildings other than the specific building, the second identification information of the specific piece of equipment intended to be installed in the specific building, and installation information concerning installation in the specific building are associated with one another,
- the installation information including one or more than one of
    - first installation information indicating a specific location of the specific piece of equipment in the specific building, and
    - second installation information indicating a direction of the specific piece of equipment after installation,
- the plurality of pieces of equipment including a plurality of pieces of communication equipment intended to be installed in the plurality of buildings,
- the specific building including a first specific building and a second specific building,
- the plurality of communication equipment including a first specific piece of communication equipment intended to be installed in the first specific building, and a second specific piece of communication equipment intended to be installed in the second specific building,
- the specific piece of equipment including a first specific piece of equipment that is installed in the first specific building, and a second specific piece of equipment that is installed in the second specific building,
- the server being configured to perform setting so as to obtain predetermined operation information designated in advance from among first operation information and second operation information by using the first specific piece of communication equipment and the second specific piece of communication equipment,
- the first operation information indicating an operation of the first specific piece of equipment when the first specific piece of equipment adjusts a room environment of the first specific building,
- the second operation information indicating an operation of the second specific piece of equipment when the second specific piece of equipment adjusts a room environment of the second specific building, and
- the server being further configured to be capable of constructing a second database in which the predetermined operation information and the installation information are associated with each other.

* * * * *